(12) United States Patent
Barker et al.

(10) Patent No.: US 7,716,023 B2
(45) Date of Patent: May 11, 2010

(54) MULTIDIMENSIONAL PROCESS CORNER DERIVATION USING SURROGATE BASED SIMULTANEOUS YIELD ANALYSIS

(75) Inventors: Aaron J. Barker, Broomfield, CO (US); Edmund L. Russell, III, Danville, CA (US)

(73) Assignee: Oracle America, Inc., Redwood Shores, CA (US)

(*) Notice: Subject to any disclaimer, the term of this patent is extended or adjusted under 35 U.S.C. 154(b) by 596 days.

(21) Appl. No.: 11/674,572

(22) Filed: Feb. 13, 2007

(65) Prior Publication Data
US 2008/0195359 A1    Aug. 14, 2008

(51) Int. Cl.
G06F 17/50    (2006.01)
G06F 9/00    (2006.01)

(52) U.S. Cl. .................. 703/2; 703/14; 716/2; 716/19; 382/103

(58) Field of Classification Search .................. 703/2, 703/14; 382/103; 716/2, 19; 345/501
See application file for complete search history.

(56) References Cited

U.S. PATENT DOCUMENTS

| | | | |
|---|---|---|---|
| 5,475,766 A * | 12/1995 | Tsuchiya et al. | 382/144 |
| 5,487,145 A * | 1/1996 | Marsh et al. | 345/501 |
| 5,790,436 A | 8/1998 | Chen | |
| 6,618,837 B1 | 9/2003 | Zhang et al. | |
| 6,658,375 B1 * | 12/2003 | McQuarrie et al. | 703/2 |
| 6,851,097 B2 | 2/2005 | Zhang et al. | |
| 7,107,571 B2 * | 9/2006 | Chang et al. | 716/19 |
| 7,313,770 B2 | 12/2007 | Zhang et al. | |
| 7,324,664 B1 * | 1/2008 | Jouppi et al. | 382/103 |
| 2004/0243320 A1 * | 12/2004 | Chang et al. | 702/30 |
| 2007/0198956 A1 * | 8/2007 | Liu et al. | 716/2 |

OTHER PUBLICATIONS

International Search Report in application No. PCT/US2008/053712 mailed Jun. 17, 2008.
Kocher, M., et al: "Statistical Methods for the Determination of Process Corners;" Quality Electronic Design, 2002; Proceedings; International Symposium on Mar. 18-21, 2002, Piscataway, NJ, US, IEEE, Mar. 18, 2002, pp. 133-137, XP010589346; ISBN: 978-0-7695-1561-8, p. 135, line 22—p. 136, line 6.

(Continued)

Primary Examiner—Thai Phan
(74) Attorney, Agent, or Firm—Robert C. Kowert; Meyertons, Hood, Kivlin, Kowert & Goetzel, P.C.

(57) ABSTRACT

A system and method for deriving semiconductor manufacturing process corners using surrogate simulations is disclosed. The method may be used to determine individual performance metric yields, the number of out-of-specification conditions for a given number of simulation samples, and a total yield prediction for simultaneous multi-variable conditions. A surrogate simulation model, such as a Response Surface Model, may be generated from circuit simulation data or parametric data measurements and may be executed using a large number of multi-variable sample points to determine process corners defining yield limits for a device. The model may also be used to simulate process shifts and exaggerated input ranges for critical device parameters. In some embodiments, the derived process corners may better represent physically possible worst-case process corners than traditional general-purpose process corners, and may address differences in process sensitivities for individual circuits of the device.

20 Claims, 12 Drawing Sheets

OTHER PUBLICATIONS

Kocher, M., et al: "SPICE Modeling of Process Variation Using Location Depth Corner Models;" IEEE Transactions on Semiconductor Manufacturing, IEEE Service Center, Piscataway, NJ, US, vol. 17, njo. 2, May 1, 2004, pp. 201-213; XP011112458; ISSN: 0894-6507.

Michael Kocher and Gerhard Rappitsch, "Statistical Methods for the Determination of Process Corners," Published in Proceedings of International Symposium on Quality Electronic Design, ISQED 2002, Mar. 18-21, 2002, San Jose, California, USA, IEEE Computer Society, 2002, online publication: http://computer.org/proceedings/isqed/1561/1561toc.htm.

* cited by examiner

MULTIDIMENSIONAL PROCESS CORNER DERIVATION USING SURROGATE BASED SIMULTANEOUS YIELD ANALYSIS

BACKGROUND OF THE INVENTION

1. Field of the Invention

This invention relates to semiconductor design and more specifically to yield analysis for manufacturing of semiconductor designs.

2. Description of the Relevant Art

In deep submicron processes, the issue of achieving reasonable yield in light of manufacturing variability is a considerable challenge. At approximately the 130 nm process node, the underlying physics and quantum mechanical effects begin to govern the behavior of CMOS technology and the ability to dictate and predict the desired behavior begins to decline. In such technologies, channel dopants are in concentrations on the order of fewer than 100 atoms with uncontrollable fluctuations from one device to another; line-width Cd-Variation becomes nearly impossible to control despite recent advances in lithography techniques; leakage is unlike anything seen before; and electrons exhibit direct tunneling through dielectrics as if they were not even there, for example.

In addition to these limitations of solid state device physics, manufacturing technologists face other difficulties in fabricating circuit structures, as evidenced by fabrication topics of late: Ultra-deep ultra-violet lithography, Optical Phase Correction (OPC), Stepper Control, Phase Shift Masks (PSM), Chemical Mechanical Polishing (CMP), Depth of Field correction (DOF), immersion lithography, etc.

These issues add up to uncertainty, variation, and great difficulty in controlling and managing the manufacturing process, which can result in tremendous yield loss. One solution is to implement Monte Carlo based simulation to model and predict yields, and then to make changes to improve yield. This is a reasonable approach but is greatly limited to smaller circuits that may not represent the semiconductor device (e.g., a microprocessor) as a whole. To address this issue, quite often analysts will derive "general-purpose" process corners at which to simulate a design for yield analysis and/or prediction. These general-purpose corners are often non-physical and/or unrealistic, and may not explore the sensitivities that are critical to the metrics of concern for a given circuit or circuit path.

Each circuit and each circuit metric may have its own sensitivities to process, temperature, voltage, signal and other environmental conditions. If these sensitivities all align, they can be systematically offset to improve yield. If not, achieving a reasonable yield becomes a trade-off exercise, which could be so severe as to produce a non-overlapping zero-yielding solution. For example, when manufacturing engineers try to improve the yield by shifting the process, they may improve a circuit-A (or their parametric probe data) but at the cost of hindering a circuit-B. For example, there may be a process condition at which a data-path of a microprocessor will yield well, but a Level 2 Cache in the same microprocessor will not. As the process is offset or shifted to accommodate the Level 2 Cache yield, the data-path yield may start to decline. Therefore, the fact that a wafer satisfies parametric yield (which makes manufacturing engineers happy), does not mean that all the circuits contained on the wafer will likewise yield reasonably well (which makes design engineers sad). All probed parametric measurements and behavior characteristics must simultaneously yield well for the product to yield well.

Using prior art methods, simulations were only done in isolation and could only assess yield for individual circuit metrics. Likewise, process corners were derived only for individual process parameters and often these corners did not represent the actual worst-case conditions as they pertained to circuit metrics. Therefore, prior art solutions often fail to identify sensitivities and critical aspects as they pertain to a particular individual circuit and to an entire semiconductor device as a whole.

SUMMARY

A system and method for modeling the effects of process variations, determining parametric yield, and analyzing yield for multiple process parameters and circuit metrics simultaneously is disclosed. The method includes deriving highly significant corners by simulating the device using a surrogate model, rather than by performing a full Monte Carlo analysis, since a full Monte Carlo analysis may not be feasible for simulation and verification of large circuits and circuit paths.

The method includes determining the simultaneous yield of two or more process parameters and/or circuit metrics. Simultaneous yield, as used herein, refers to an assessment of the likelihood that each circuit metric or process parameter falls within its lower and upper specification limits at the same time specification limits for all other metrics are satisfied. The method also includes deriving the corners most likely to represent physically attainable simultaneous yield limits for larger circuits and to use these corners for full-scale simulation analysis.

In some embodiments the method includes first identifying critical device parameters of a semiconductor device. The method may also include defining specification limits for critical performance measures and determining a distribution of each of the measures as the device parameters are varied. The device parameters of interest may be varied one at a time, in some embodiments, or two or more at a time, in other embodiments (e.g., using Latin HyperCube sampling.) The distribution may be determined using an external circuit simulation or by measuring parametric data of actual devices, in different embodiments. This data may then be used to generate a surrogate simulation model (e.g., a Response Surface Model, or RSM). In some embodiments, the surrogate simulation model may initially be generated using simple (e.g., $2^{nd}$ order) terms representing device parameter values and may be improved by removing terms that are not correlated with the measures of interest or that are physically unlikely to occur.

The surrogate simulation model may be used to execute multi-variable simulations of the device much faster and/or for many more sample points than would be possible using a full circuit model of the device, in some embodiments. These multi-variable simulations may be used to determine overlapping yields for two or more critical performance measures over specified device parameter ranges.

The methods may also include identifying, from the surrogate simulations, candidate process corners that represent yield limits for combinations of device parameters beyond which the critical performance measurements will be out-of-specification, in some embodiments. In some embodiments, these candidate corners may be sorted according to their respective root sum square values or other statistical criteria (e.g., total variance of the system or "System_sigma") to identify those corners nearest to the process center, and thus more likely to be physically attainable. In other embodiments, candidate corners may be sorted according to the severity of a specification violation, expected future process controls, or other weighting criteria, depending on the specific sensitivities of the device. These corners may then be fed back into the surrogate simulator to estimate manufacturing yields at these limits.

In some embodiments, the methods may also be used to determine if two or more of the critical device parameters are positively correlated, negatively correlated, or not correlated with respect to the critical performance measures. For example, some combinations of device parameter values are not physically possible (or not physically likely), while other combinations work together to improve or hinder performance.

The surrogate simulator may in some embodiments be used to simulate a manufacturing process shift by modifying the distribution in the simulation to shift or exaggerate the range of inputs, or to focus on a particular region of interest, for example. Using this approach a designer may be able to reasonably assess yield under process drift and determine how the process may be shifted to achieve higher yield.

The methods described herein may be implemented in a single computing system, having one or more processor cores, and/or may be implemented as program instructions encoded on a computer-readable storage medium for execution by the processor core(s). In some embodiments, the program instructions may be dispatched for parallel execution to multiple processors of a single system or to multiple computer systems in a distributed computing environment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

During the design of semiconductor devices, circuit simulations (e.g., post-layout circuit simulations) may be performed using a net-list extracted from the design layout, and may provide an assessment of the circuit speed, the influence of circuit parasitics (such as parasitic capacitances and resistances), and any glitches that may occur due to signal delay mismatches. Any circuit sensitivities identified by during simulation may be corrected using an iterative approach until the simulations indicate that the device is likely to meet functionality and performance goals and to yield reasonably well. Once these simulations are complete (and any identified design rule errors are corrected), the design may be ready for fabrication and may be sent to a fabrication facility.

Figure 1:
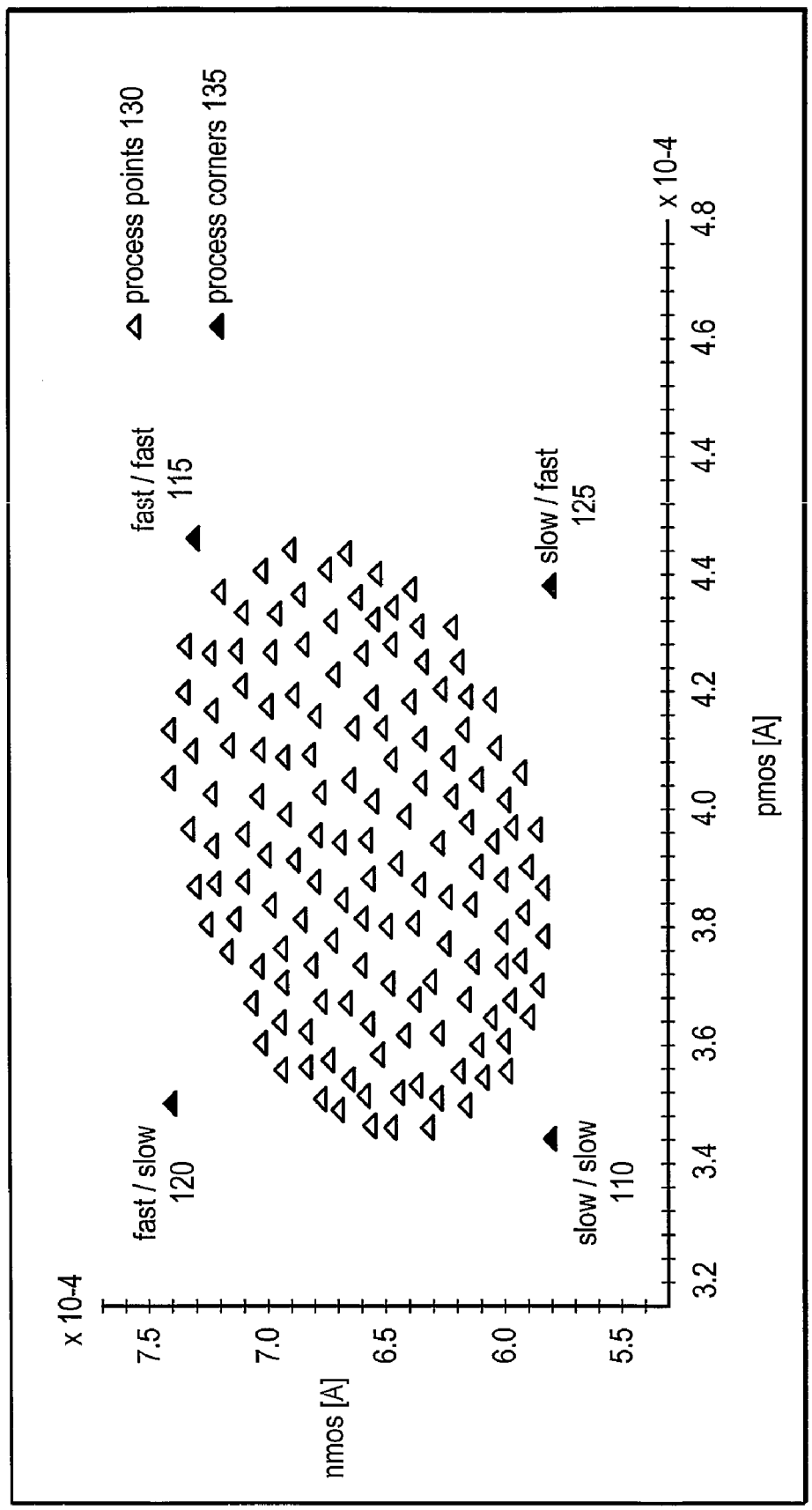
FIG. 1 illustrates an exemplary placement of worst-case process corners versus a process window for NMOS and PMOS speed metrics of a given semiconductor device.

Traditionally, process corners (e.g., typical, best-case, and worst-case process parameter combinations) have been chosen for circuit simulations based on simulations and/or yield data related to individual circuit parameters and/or process parameters. FIG. 1, for example, illustrates the traditional placement of worst-case process corners versus the process window for NMOS and PMOS speed metrics of a given semiconductor device. In this example, four process corners 135 are defined based on a larger number of measured or simulated process points 130. These process corners are "fast PMOS"/"slow NMOS" (illustrated as fast/slow corner 120), "fast PMOS"/"fast NMOS" (illustrated as fast/fast corner 115), "slow PMOS"/"slow NMOS" (illustrated as slow/slow corner 110), and "slow PMOS"/"fast NMOS" (illustrated as slow/fast corner 125). In this example, the corners chosen for worst-case simulation are those corresponding to the corners fast/slow 120 and slow/fast 125. However, for many integrated circuit designs and associated manufacturing processes, what makes the PMOS transistors fast also makes the NMOS transistors fast and what makes the PMOS transistors slow also makes the NMOS transistors slow. Therefore, choosing worst-case scenarios in which fast PMOS transistors are combined with slow NMOS transistors, or slow PMOS transistors are combined with fast NMOS transistors, may result in simulating the integrated circuit under unrealistic (e.g., non-physical) conditions. For example, if a roughly 3.8σ process point for fast NMOS devices (i.e., those having strong drive characteristics) includes an oxide thickness of −1.56σ, and a roughly 5.8σ process point for slow PMOS devices (i.e., those having weak drive characteristics) includes an oxide thickness of +2σ, had the characteristics of this "slow/fast" corner been physically possible, the probability of having both fast NMOS devices and slow PMOS devices on a single die may be 1 in 6.476 trillion. This probability is calculated by multiplying the Upper Tail Probability for a Normal distribution (UTPN) of the fast NMOS case by the UTPN of the slow PMOS case, or [UTPN (3.82)*UTPN (5.86)]. The UTPN is described in more detail later. A more reasonable (i.e., more likely to occur) fast NMOS/slow PMOS corner may be defined in terms of other device parameters, such as dopant concentrations, length, etc.

Figure 2:
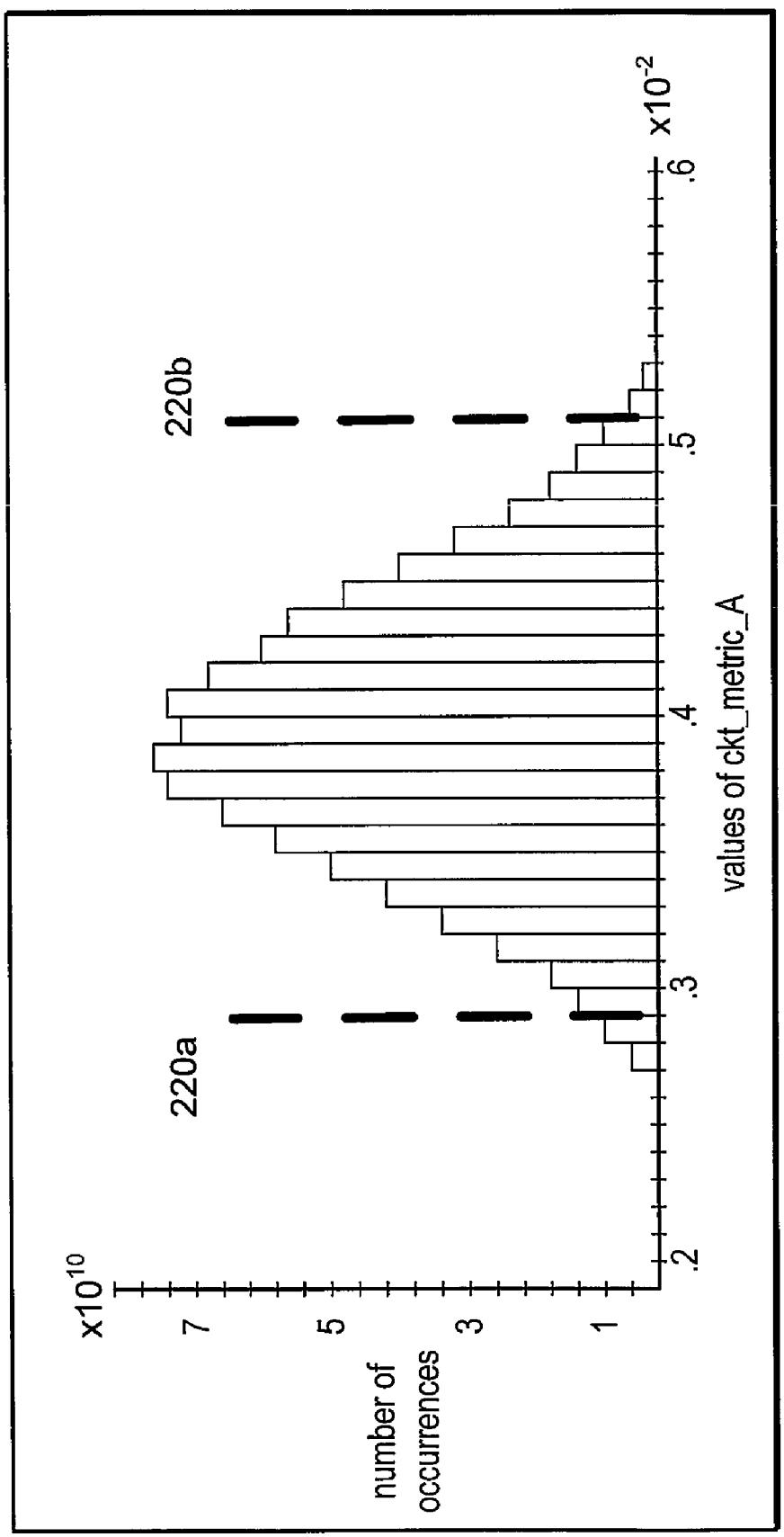
FIG. 2 illustrates an exemplary placement of process corners derived based on the data distribution for a single circuit metric.

In another example, FIG. 2 illustrates an approach in which corners are derived based on the data distribution for a single circuit metric. In this example, ckt_metric_A may be a circuit metric (e.g., current, delay, noise) of critical importance to a particular circuit (circuit 1) of the integrated circuit device (e.g., to the speed of a data path, the access time of a memory array, the accuracy of an analog-to-digital converter, etc.) The height of each bar in the histogram represents the number of occurrences of each of the data values (or data value ranges) for ckt_metric_A shown along the horizontal axis. In this example, the worst-case process corners 220a and 220b identified in FIG. 2 were derived from simulations and/or yield data corresponding to process points at which ckt_metric_A is out of specification (i.e., process points for which the value of ckt_metric_A is unacceptable.) The lines indicating process corners 220a and 220b indicate the respective values of ckt_metric_A at the worst-case process corners. In this example, the distribution of ckt_metric_A and the placement of the identified worst-case process corners 220a and 220b are well aligned. That is, the process points at which the value of ckt_metric_A are out of specification (those in which the value of ckt_metric_A is less than the value corresponding to process corner 220a or greater than the value corresponding to process corner 220b) are process points which are realistic physical possibilities that align with the upper and lower tails of the distribution.

Figure 3:
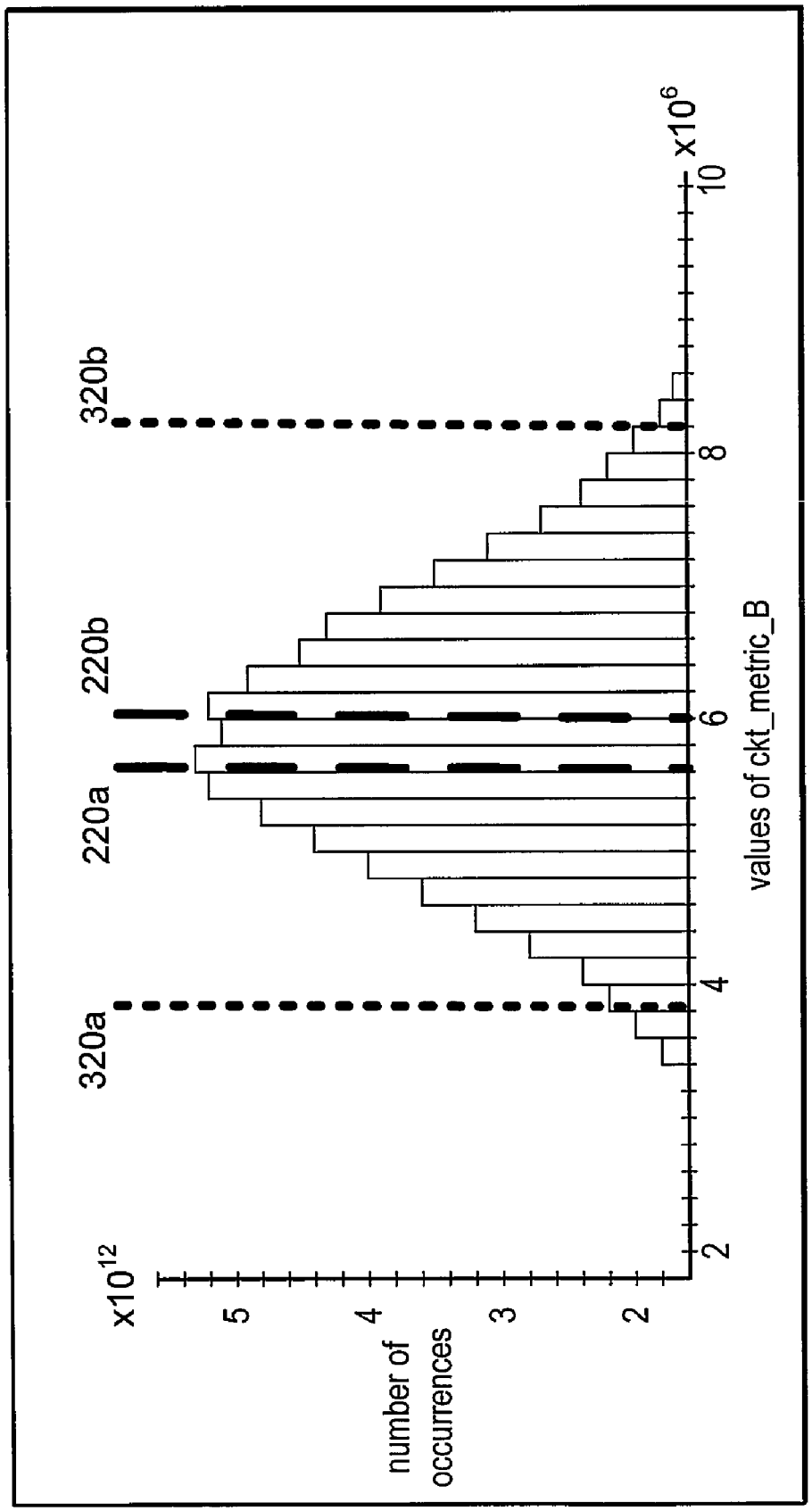
FIG. 3 illustrates the projection of process corners derived based on one circuit metric onto a distribution of another circuit metric.

The process corners derived based on ckt_metric_A for circuit 1 of the semiconductor device may or may not be useful for predicting the yield of another circuit of the same semiconductor device. That is, the yield of the other circuit may not be well correlated with the same device parameters that affect ckt_metric_A, but may be highly dependent on one or more different device parameters. This is illustrated by the example in FIG. 3. In this example, the histogram illustrates the distribution of values for a different metric from a separate circuit of the semiconductor device. The vertical, dashed lines in FIG. 3 indicate the projection of process corners 220a and 220b (derived based on ckt_metric_A and circuit 1) onto the distribution of the values of ckt_metric_B in circuit 2. As shown in FIG. 3, these corners do not appear to be relevant to ckt_metric_B in circuit 2. This may be due to the fact that individual circuit metrics have their own sensitivities to process, voltage, temperature, and signal, thus the sensitivities of ckt_metric_A may not be the same as the sensitivities of ckt_metric_B. For example, the delay of a ring oscillator with a fan-out of 1 may be highly sensitive to saturation current, while the delay of a ring oscillator with a fan-out of 4 may be more sensitive to gate capacitance than to saturation current.

In the example illustrated in FIG. 3, ckt_metric_B is not well correlated with process corners 220a and 220b, and many data values for ckt_metric_B that occur outside of these process corners (and which may or may not be considered out of specification for ckt_metric_B) are very likely to occur in circuit 2. If the yield of circuit 2 were predicted based on process corners 220a and 220b, the predicted yield would be very low, in this example, while the actual yield of circuit 2 may be much higher.

FIG. 3 further illustrates process corners 320a and 320b, which are derived based on the acceptable range of values for ckt_metric_B. These process corners are indicated by the dotted vertical lines in FIG. 3. Process corners 320a and 320b may be defined using different values of the same device parameter(s) as those used to define process corners 220a and 220b (e.g., channel length/width, saturation current, gate capacitance, sheet resistance) or may be defined by a range of values for one or more other device parameters. In this example, process corners 320a and 320b are well correlated with ckt_metric_B. That is, the values of ckt_metric_B that fall outside of those corresponding to process corners 320a and 320b correspond to the upper and lower tails of the distribution. If ckt_metric_B is critical to the functionality and performance of circuit 2, but ckt_metric_A is not, simulations performed at process corners 320a and 320b may be better suited for predicting the behavior and/or yield of circuit 2 than simulations performed at process corners 220a and 220b, in this example.

Figure 4:
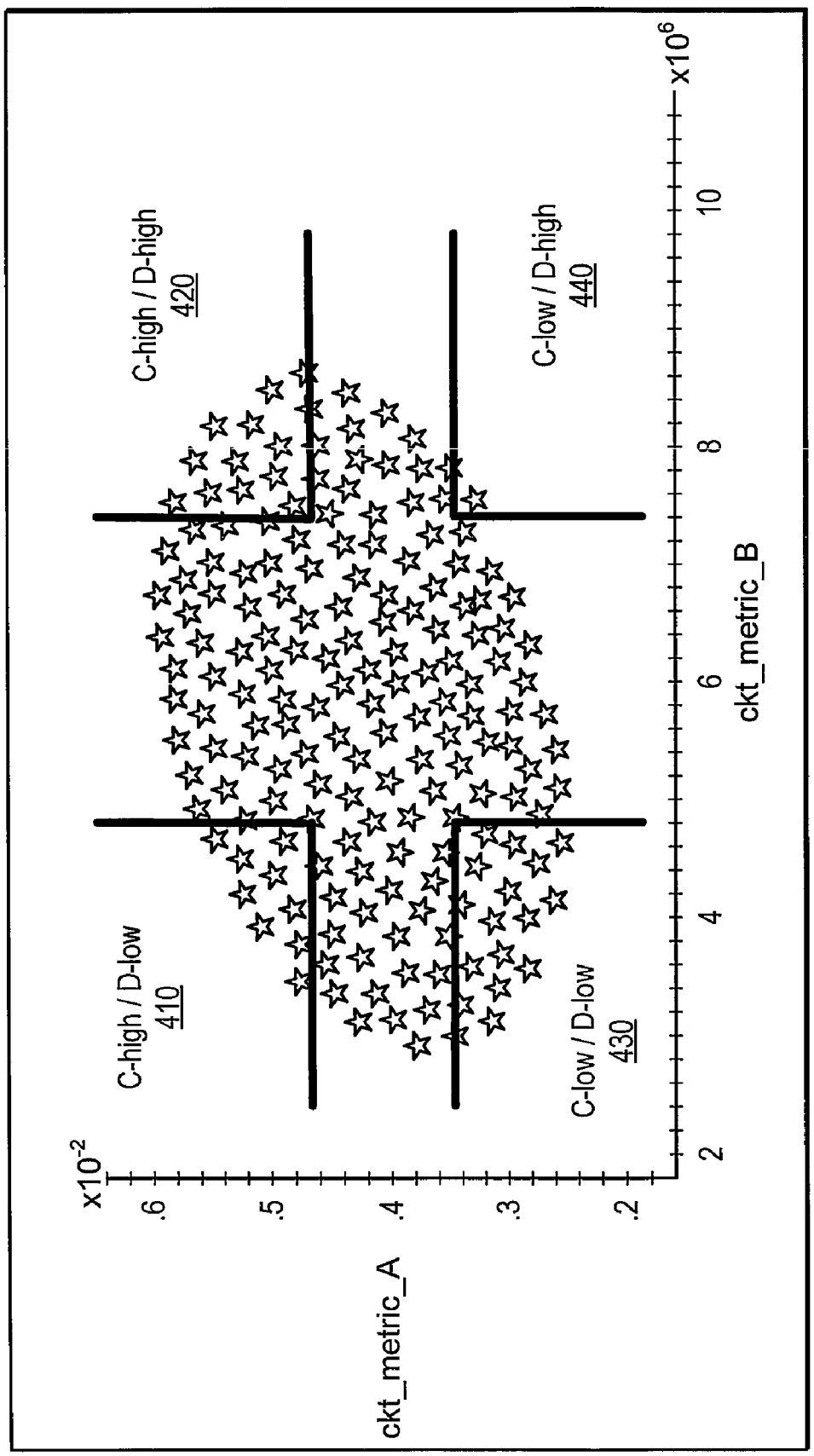
FIG. 4 illustrates four process corners derived for two circuit metrics simultaneously, according to one embodiment.

The method for deriving simulation corners described herein may address the issues illustrated in FIGS. 1-3 and discussed above. The method includes deriving corners for multiple circuit metrics simultaneously and defining a compromised corner that encapsulates the sensitivities of each metric. The method may also address the problems with traditional simulation and sampling methods, in which a prohibitive number or iterations must be performed in order to obtain a solution that identifies a well rounded and representative process corner for several specification limits and/or circuit metrics to be satisfied simultaneously. For example, using some prior art methods, hundreds of thousands of Monte Carlo iterations may be required to obtain a reasonable solution. FIG. 4 illustrates four process corners derived for two circuit metrics simultaneously. In this example, each corner is defined by upper and lower specification limits for the values of two process parameters, C and D. For example, corner 410 is defined by a parameter C value higher than the upper specification limit for parameter C and a parameter D value lower than the lower specification limit for parameter D. Similarly, corner 420 is defined by a parameter C value higher than the upper specification limit for parameter C and a parameter D value higher than the upper specification limit for parameter D. As illustrated in FIG. 4, these process corners define ranges of values for parameters C and D in which ckt_metric_A and ckt_metric_B will simultaneously yield and ranges in which they will not both yield. In other examples, process corners may be derived to define ranges in which more than two circuit metrics will simultaneously yield.

Figure 5:
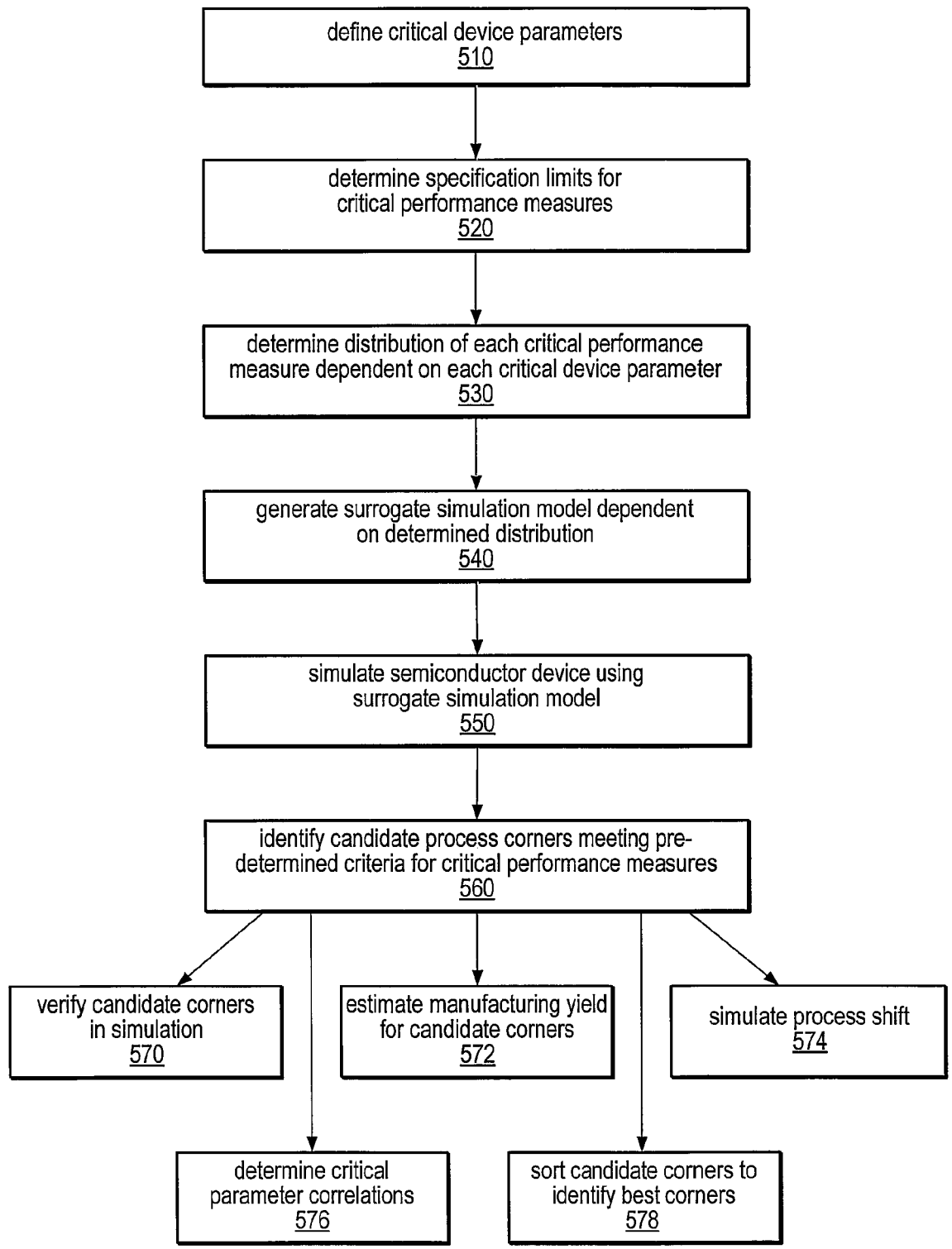
FIG. 5 illustrates one embodiment of a method for deriving process corners using surrogate simulation.

One embodiment of a method for deriving process corners is illustrated by the flow chart in FIG. 5. In this embodiment, critical device parameters may first be defined, as in 510 and a statistical system may be formulated describing the variance of each of the critical device parameters. The critical device parameters may include physical characteristics, such as channel length and width for typical transistors, oxide thickness, and dopant concentrations, and/or behavioral characteristics, such as saturation currents, mobility, resistance/capacitance/inductance values for various parasitic and interconnect structures, threshold voltages, etc. For example, the critical dimensions for channel length/width variation might take on the canonical form:

$$L = l\_nominal + l\_stdDev * l\_sigma$$

$$W = w\_nominal + w\_stdDev * w\_sigma$$

This same kind of formulation may be applied to all the critical device parameters (also known as "critical dimensions") of the process, including temperature, voltage, environment, signals, and system parameters. In general, any of the critical device parameters may be represented using a similar canonical form:

$$CD = CD\_nominal\_CD\_stdDev * CD\_sigma$$

The equations describing the variance of each device parameter may in some embodiments be more complex than in the examples above (depending on the physics that govern the variability, causality, and correlation of various factors), but in other embodiments, the canonical form may be adequate. The underlying simulator (e.g., SPICE) may in some embodiments be configured to handle the complexities of the physics governing the system. The nominal values and standard deviations of the values for each device parameters may be derived from physical measurements (such as those measured during wafer probing of device structures placed on the wafers for this purpose) or determined by specification limits, in different embodiments. In some embodiments, upper specification limit (USL) values and lower specification limit (LSL) values may be set at +/−3-sigma to adhere to a process capability (Cpk) of 1, as defined below:

$Cp=(USL-LSL)/6\sigma$ $Cpk=\min[(USL-\mu)/3\sigma,(\mu-LSL)/3\sigma]$

The method illustrated in FIG. 5 also includes defining specification limits for critical performance measures, as in 520. For example, upper and lower specification limits may be defined for various power, noise, current, area, or delay values critical to the performance of the semiconductor device or of a particular circuit of the device.

In the example illustrated in FIG. 5, the method may include determining a distribution of each critical performance. In some embodiments, the distribution may be determined by running a Monte Carlo analysis on the system sweeping the "seeds" of the critical dimensions (e.g., w_sigma, l_sigma) using a Gaussian distribution centered about zero with a standard deviation of one. In some embodiments, in order to obtain a cleaner model, the seeds may be exacerbated using a uniform distribution of their values out to 6-sigma or beyond. For example, in one embodiment, Latin Hypercube sampling may be used as the Monte Carlo method in order to get good dispersion and unique sampling in the seeds. From the Monte Carlo simulation (e.g., SPICE) results the seeds (e.g., l_sigma, w_sigma, cd1_sigma, cd2_sigma) and corresponding measurements for the critical performance measures (e.g., power, noise, delay, current, area, etc) may be obtained. In general, the data set for generating the surrogate model may be improved by including strategic samples and evaluating the responses. These strategic samples may be selected from any or all of: the nominal conditions for all seeds, the modification of one seed at a time at both the low end and high end of its range, and the permutations of all the low/high combinations of seed values. The surrogate model may best represent the system when the sampling method used is balanced and as orthogonal as possible while covering the space of interest.

The method illustrated in FIG. 5 also includes generating a surrogate simulation model dependent on the determined distribution for each of the critical performance measures, as shown in 540. In some embodiments, generating the surrogate simulations model may involve fitting a Response Surface Model (RSM) to the system. For example, in one embodiment, a polynomial expansion with cross product terms and some key non-linear terms (A*1/sqrt(x)+B*ln(x), etc.) may be chosen based upon the governing physics, as in the equation below:

$$delay = delay\_nominal + l\_StdDev * l\_sigma + w\_stdDev * w\_sigma + lw\_stdDev * l\_sigma * w\_sigma + l\_sq\_stdDev * l\_sigma^2 + w\_sq\_stdDev * w\_sigma^2 + CD3\_StdDev * CD3\_sigma \ldots$$

Figure 8:
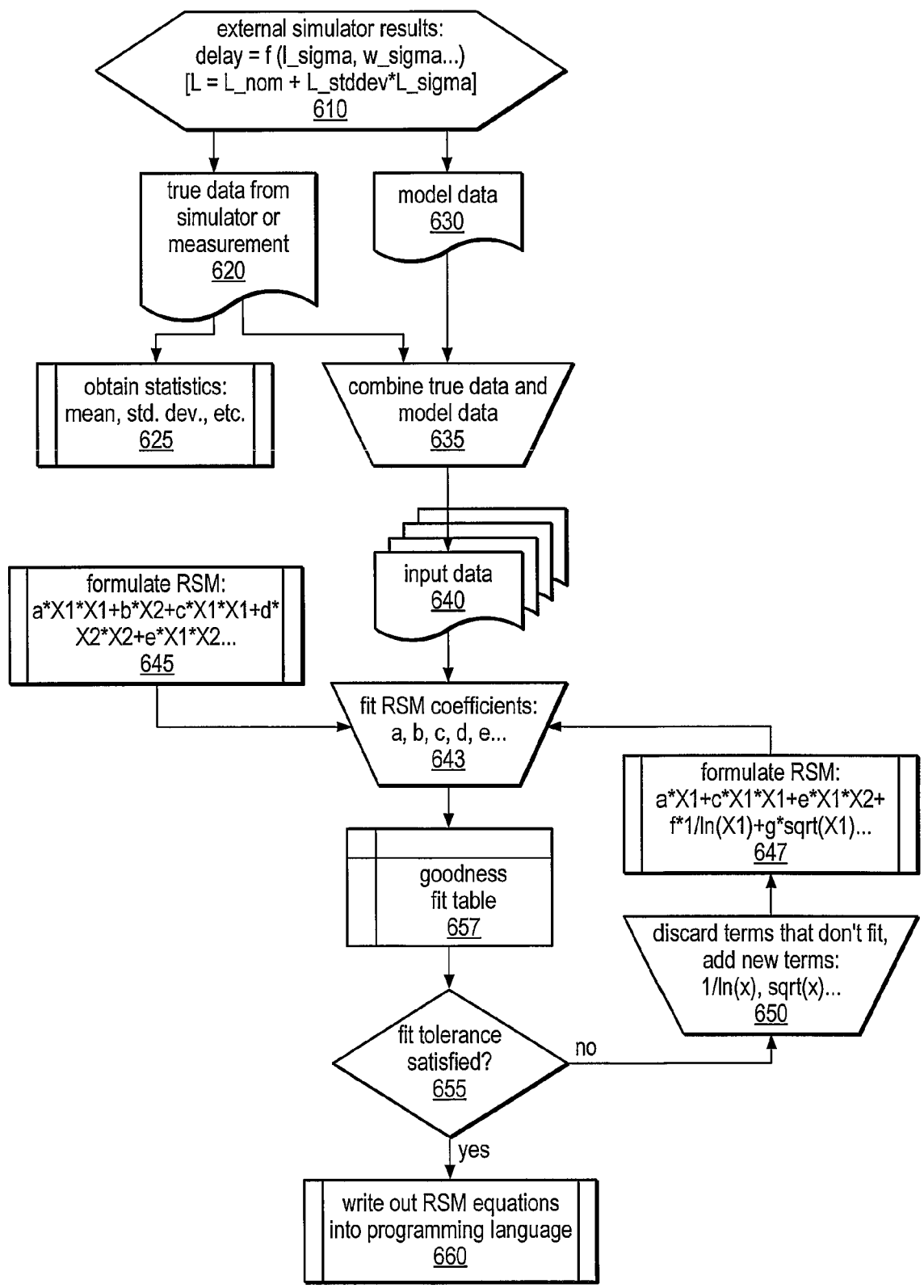
FIG. 8 illustrates an exemplary method for generating and improving a surrogate simulation model.

A more detailed method for generating and improving the surrogate simulation model is illustrated in FIG. 8 and will be discussed in more detail below. In some embodiments, a commercially available statistical analysis package (e.g., SAS®) may be used to fit this model to the system, while in other embodiments, custom or semi-custom software may be used to generate the surrogate simulation model.

Once a reasonable surrogate simulation model has been generated, the method illustrated in FIG. 5 includes simulating the semiconductor device by running surrogate simulation, as in 550. Surrogate simulation is a method often used by statisticians to model and simulate a sub-region of significant interest. In some embodiments, this method uses simplified arithmetic models to emulate a complex system, thus allowing the analyst to perform fast simulations that represent more detailed and relatively slower traditional simulations. Using surrogate simulation, the number of Monte Carlo iterations may in some embodiments be increased on the order of at least 10-100 times the original data set's size. In some embodiments, the recommended sample size may be based on the Binomial confidence interval for the desired level of precision. The reason behind this is two-fold: 1) to predict yield and 2) to produce enough candidate corners that a suitable corner may be identified. This method may particularly useful when selecting multiple criteria. For example, it may take a large number of samples to obtain a reasonably sized region of overlap when assessing simultaneous yield (i.e., it may take many samples to identify process corner limits at which the probability is high that multiple metrics will be within their given upper and lower specification limits, depending on the correlations of the metrics.)

As illustrated in FIG. 5, the method may next include identifying candidate process corners meeting pre-determined criteria for critical performance measures, as shown in 560. In this example, the surrogate based simulations (which may number in the hundreds of thousands or in the millions) may be used to identify candidate corners in which the circuit's response to the seeds match the pre-determined corner criteria, i.e., in which:

measure1>USL_m1 && measure2<LSL_m2 && measure3>USL_m3

Note that the use of the AND operator (&&) in the above statement indicates that all of the specified criteria must be met in order to define the corner.

In some embodiments, if any given Monte Carlo iteration produces a response that matches all pre-determined corner criteria, the parameters of that iteration may be used to define a candidate corner. Examples of four candidate corners derived for two circuit metric criteria are illustrated in FIG. 4, although any number of criteria may be used to derive and/or define a candidate corner.

Note that in some embodiments, not all identified candidate corners are equally suitable for use in simulating performance or predicting overall yield of the semiconductor device. In 510 a statistical system was formulated that deliberately assigned a given statistical weighting for each of the critical device parameters (e.g., to model the likelihood of each condition). However, statistics (specifically, Variance Sum Law I) dictates how the overall variance of a system is dependent on the variance of multiple independent variables. For example:

$$\text{System\_sigma} = \text{sqrt}(l\_sigma^2 + w\_sigma^2 \ldots)$$

where l_sigma and w_sigma (e.g., the input seeds for the surrogate simulation) are independent.

In addition, Variance Sum Law II dictates that:

$$\text{System\_sigma} = \text{sqrt}(l\_sigma^2 + w\_sigma^2 + 2*P*l\_sigma*w\_sigma \ldots)$$

where P is the correlation between l_sigma and w_sigma.

In some embodiments, the method includes minimizing the variance of the system in order to find the corner closest to the process center/target. This corner may in some embodiments also represent the most likely deviation to produce the out-of-specification condition defined by the candidate corner. Therefore, the method illustrated in FIG. 5 includes sorting candidate corners to identify the best corners (i.e., those that are most suitable for the simulations of interest), as shown in 578. In some embodiments, the candidate corner with the smallest System_sigma value is the "best" corner that simultaneously matches all measure/metric criteria.

In some embodiments, as the number of Monte Carlo iterations approaches infinity, the non-sensitive device parameters will approach zero or their nominal condition(s). In this way, the most critical device parameters (e.g., critical dimensions) may be identified for the performance metrics of interest.

Note that a method for deriving process corners using surrogate simulation and as described herein may include more, fewer, or different operations than those illustrated in the exemplary flow chart of FIG. 5, according to various embodiments. For example, in some embodiments, one or more of the operations illustrated in FIG. 5 may be omitted or may be performed in a different order. Similarly, the method may include additional operations and/or feedback loops not shown in FIG. 5.

In some embodiments, candidate corners identified as in 560 (or "best" corners, sorted as in 578) may be used by the method in estimating manufacturing yields (as in 572), to determine critical device parameter correlations (as in 576), or to simulate the effects of various process shifts (as in 574). For example, in some embodiments, the method may include determining which metrics increase or decrease yield by comparing surrogate simulation results to some basic statistics. Basic statistics may be used to determine the combined probability of multiple uncorrelated events occurring and this may be compared to the System_sigma and parts per million out-of-spec conditions produced by surrogate simulations.

One method of determining correlation from out-of-spec surrogate results is illustrated by the following example. Basic statistics may be used to calculate the likelihood of a single 2-sigma event occurring and to calculate the likelihood of two independent 2-sigma events occurring. In one embodiment, a script (referred to herein as a sigma percent script) may be written to calculate the area under a normal-curve distribution to obtain these probabilities and the method described herein may include execution of the script. The script may be used to calculate the area under a portion of the distribution curve corresponding to a given deviation from the mean (e.g., the area under the curve bounded by the −2-sigma and +2-sigma values.) Note that while this and other examples described herein involve normal distributions, the method (and/or script) may be applied to any arbitrary, but identifiable, distributions that may be described using a function. In other words, this method may be applied to other distributions as long as there is an equation that algorithmically describes the shape of a histogram representing the distribution.

Basic statistics dictates that for a single 2-sigma event, the percentage yield is expected to be 95.45% (for a normal distribution). Therefore, the likelihood of exceeding the +2 sigma point is calculated to be [(1−0.95)/2], or 2.275%. This is otherwise known as the Upper Tail Probability for a Normal distribution (UTPN). As noted above, a script may be used to calculate the normal point, percentage yield, UTPN, defective PPM, etc., for given combinations of values for the mean, standard deviation, and sigma target. For example, using such a script (and assuming a normal distribution), if the inputs are:

mean=0, var=1, standard deviation=1, and sigma target=2 the outputs may be:
normal point=0.135335283236613
T_area=0.0570261247236503
UTPN=0.02275013223970888
percent_yield=95.4499735520582
defective PPM=45500.2644794176

Similarly, if the yield is to be predicted for a process shift (e.g., when following a Six Sigma methodology), the inputs may be:

mean=1.5, var=1, standard deviation=1, and sigma target=2 and the outputs may be:
normal point=0.135335283236613
T_area=0.773388919546092
UTPN=0.308537539200908
percent_yield=69.1462460799092
defective PPM=308537.539200908

Note that simulation of process shifts is discussed in more detail later.

The likelihood of two unrelated 2-sigma events having a normal distribution occurring may be calculated as [0.02275*0.02275], or 0.05176%. Note that calculating the likelihood of non-correlated/independent events occurring simultaneously involves a simple combination (multiplication) of the probabilities of the occurrence each of the single events. Therefore, based on the combination of probabilities for two 2-sigma events, the theoretical number of out-of-spec conditions for two non-correlated/independent events occurring simultaneously is 517 parts per million out-of-spec.

In one embodiment, the UTPN may be calculated as:

$$UTPN = \lfloor 1/\sqrt{2\pi \text{Variance}} \rfloor \int_{Sigma\_Target}^{\infty} e^{(t-Mean)^2/2Variance} dt$$

In some embodiments, when candidate corners are derived, the combined likelihood of two non-correlated/independent 2-sigma events occurring (0.05176%, in this example) may be used as datum for comparison. For example, if the likelihood of an out-of-spec condition for one candidate corner defined by two events (e.g., by two events defined in terms of different critical dimensions) is found to be greater than this value, this may indicate that the two events are correlated in a manner in that increases the likelihood of them occurring simultaneously. Similarly, if the likelihood of an out-of-spec condition for the candidate corner is found to be less than this value, this may indicate the two events are correlated in a way in that is not very likely to occur and that, therefore, this corner may not be as important to simulate.

Raw data from a surrogate simulation for this example is shown below. This data illustrates two 2-sigma corners (sf, fs) derived from a surrogate simulation:

```
corner sf rss 3.94892807473009, Sample #668937
candidate_corners=57/1000000 [Out of Spec]
.lib sf
.param cd1_sigma=0.791080947253036
.param w_sigma=0.0869981870059254
.param cd2_sigma=-1.61244592679803
.param cd3_sigma=-1.42858720509222
.param l_sigma=0.0456601048897788
.param cd4_sigma=2.0010804813444
.param cd5_sigma=-0.368019143969811
.param cd6_sigma=-2.48555142614618
.endl sf
corner fs rss 3.70740830597051, Sample #906665
candidate_corners=62/1000000 [Out of Spec]
.lib fs
.param cd1_sigma=-1.06402644227843
.param w_sigma=0.394865629219539
.param cd2_sigma=1.96725198029417
.param cd3_sigma=0.0822601252564813
.param l_sigma=-0.455333443012649
.param cd4_sigma=-2.56063224727608
.param cd5_sigma=0.492007405910606
.param cd6_sigma=1.25448028777146
.endl fs
```

As illustrated above, the first corner, sf, has an RSS value of 3.94892807473009, and a likelihood of occurrence of 0.0057%. The second corner, fs, has an RSS value of 3.70740830597051, and a likelihood of occurrence of 0.0062%. Using the RSS value as the sigma target for the sf corner, the yield may be predicted using the sigma percent script. In this example, the inputs may be:

mean=0, var=1, standard deviation=1, and sigma target=3.948928 and the outputs may be:
normal point=0.000410959382415226
T_area=9.83876159767028e-05
UTPN=3.92509798810049e-05
percent_yield=99.9921498040238
defective PPM=78.5019597620099 modeling a process shift, according to a Six Sigma methodology, the inputs may be:

mean=1.5, var=1, stdDev=1, sigma_target=3.948928 and the outputs may be:
normal point=0.000410959382415226
T_area=0.0179577467271352
UTPN=0.00716410443019446
percent_yield=99.2835895569806
defective PPM=7164.10443019446

For this surrogate simulation, the raw data above indicates that the likelihood of the sf corner defined above occurring is 0.0057%. In this example, the data may indicate that n and p are correlated, but not in a manner that produces Slow/Fast corners, such as the sf corner defined above. This is indicated by the fact that the likelihood of this corner occurring is 0.0057%, which is much less than the predicted value for two non-correlated/independent events (0.05176%). Similarly, using the process sigma (RSS) metric determined for the sf corner and assuming that the events are non-correlated/independent, the likelihood of a Slow/Fast corner would have been 0.0410959%. This is indicated as the "normal point" in the percent script output data for the examples above.

Figure 6:
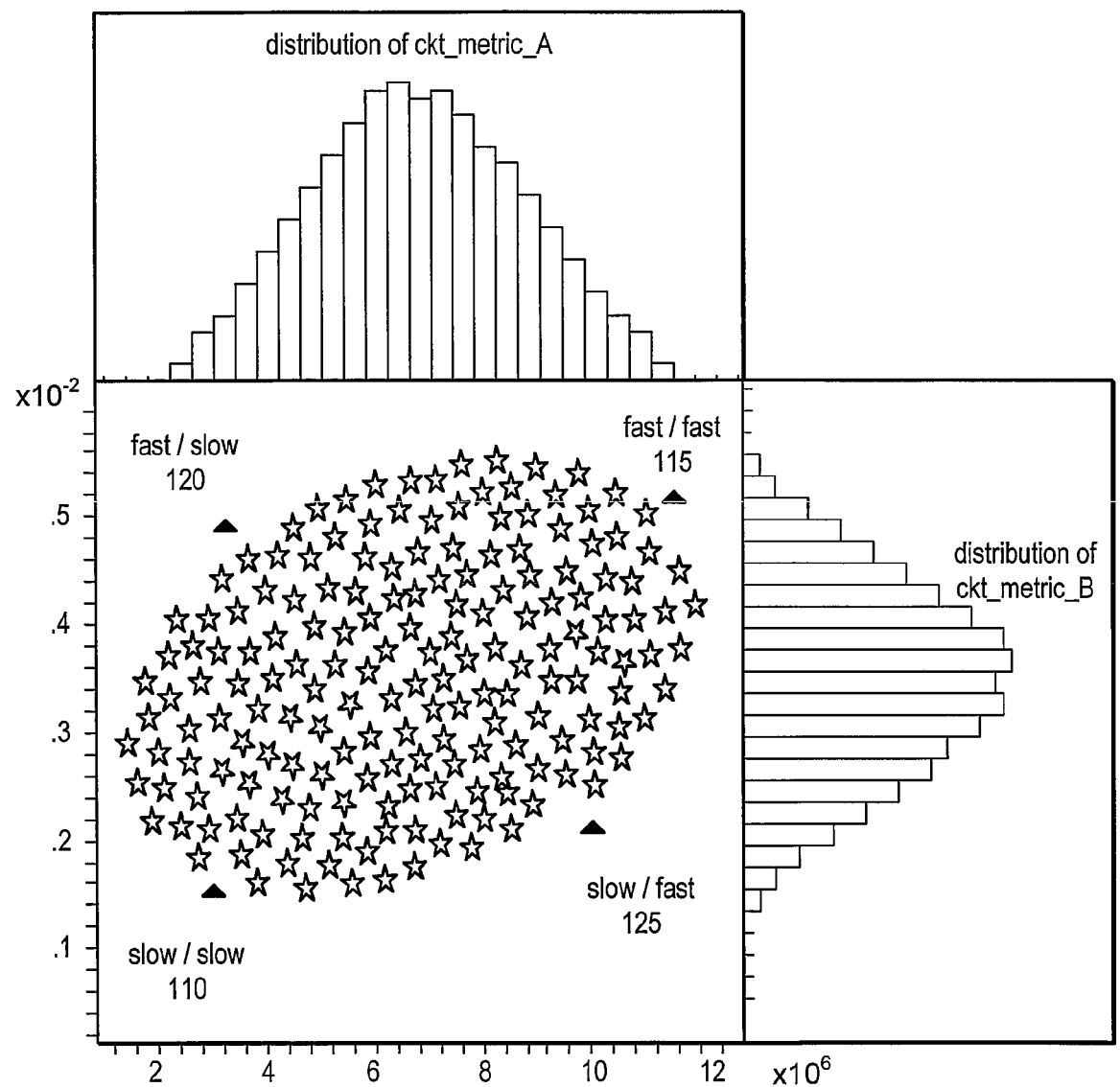
FIG. 6 illustrates two 2-sigma corners derived from a surrogate simulator, according to one embodiment.

In this example, the two 2-sigma corners (fast/slow 120, slow/fast 125) derived from the surrogate simulator retain the physical characteristics of the process window. This is illustrated by the exemplary plot in FIG. 6. Note that in this example, two other corners representing fast/fast 115 and slow/slow 110 may be derived from two 3-sigma conditions, rather than from 2-sigma conditions since the correlation between the Fast P and Fast N make the simultaneous condition more likely (denoted by the elliptical shape of the bivariate plot in FIG. 6).

As previously noted, the RSS value of two independent 2-sigma events should also be around 3.281 sigma or 517/1M out-of-spec conditions (for a single sided distribution). Feeding this RSS value into the percent sigma script with these inputs:

mean=0, var=1, standard deviation=1, sigma target=3.281 may yield the following outputs:
normal point=0.00459640639167001
T_area=0.00129642497325891
UTPN=0.000517198735201258
percent_yield=99.8965602529597
defective PPM=1034.39747040252

Simulating a process shift with these inputs:
mean=1.5, var=1, standard deviation=1, sigma target=3.281 may yield the following outputs:
normal point=0.00459640639167001
T_area=0.093888834421951
UTPN=0.0374562257085244
percent_yield=96.2543774291476
defective PPM=37456.2257085244

Note that in some embodiments, the statistical values generated by the surrogate simulation may be slightly different than the statistics calculated using the percent sigma script, depending on the sample simulated. For example, simulating using one random sample may result in a PPM value of 525 versus 517 PPM, while a simulation with another choice may have shown 507 PPM as the result.

Using these methods, it may be determined if various combinations of device parameters and/or circuit metrics align well for improving yield or if they are detrimental to yield. From the standpoint of corner derivation, these methods may be used to determine whether or not the circuit metric criteria and/or device parameter combinations are representative of physical or non-physical relationships. In addition, the methods may be used to determine the significance of these relationships, not only in terms of percentage yield, but also relative to an uncorrelated baseline determined by statistics. In some embodiments, a metric of correlation may be reported back to the circuit designers to let them know if their combination of circuits is a help or a hindrance to the overall yield of the device as a whole.

As shown in FIG. 5, once candidate corners have been identified (or the "best" corners have been identified through sorting, as in 578), the candidate or best corners may be put back into the original statistical system and simulated for verification, in some embodiments. This is illustrated at 570. In some embodiments, these very precise and physically attainable corners may then be applied to larger systems than those that may be accommodated using a traditional full-scale Monte Carlo analysis.

In some embodiments, analyzing the accuracy and "entropy" of the surrogate simulator may involve feeding the results from the surrogate simulation back into the surrogate simulator and generating new results. After a few iterations, the method may include checking to see if the results have stabilized and if they still resemble the original input from the original circuit simulations (e.g., the original single-variable SPICE simulations). In some embodiments, these iterative operations may improve the quality of data and may allow it to be extrapolated and projected further than the data resulting from the original analysis. In some embodiments, another way to ensure the accuracy of the surrogate simulator may involve feeding the seeds from the surrogate simulator back into the original simulator (e.g., SPICE) and performing a point-by-point comparison of the results.

The following is an example in which the results of a surrogate simulation and its corresponding derived corners are analyzed. In this example, 3-sigma constraints were specified for nmos and pmos transistor speeds to define a slow/slow (ss) corner, based on a suitable number of SPICE iterations. In some embodiments, as long as the number of circuit simulations is equal to or greater than ten times the number of input seeds (i.e., critical dimensions), the sample size may be sufficient for generating a reasonable RSM. That is, this may be a sufficient number of samples to model the terms in the RSM and have sufficient degrees of freedom for error. In other embodiments, such as when modeling a well-behaved, manufacturable process, even fewer samples may suffice. In this example, the speed constraints are defined as the mean speed minus three times the standard deviation, or:

$$n\_speed = 0.0007947381 - 3*4.847039e\text{-}05 = 0.00065$$

$$p\_speed = 0.0004226042 - 3*2.39614e\text{-}05 = 0.00035$$

In this example, the surrogate simulator predicted values of
n_speed=0.000646647284513867
p_speed=0.000347695947609742 and the SPICE verified values were:
n_speed=0.000646451
p_speed=0.000347681 where the SPICE verified values are values determined using SPICE simulations at the identified corner.

In this example, the surrogate simulator predicted values match the SPICE verified values reasonably well. In the example above, 1 million iterations (a rather limited sample size in light of a goal of deriving two 3-sigma events) were performed and five candidate corners were identified to choose from. In general, the number of runs may be increased to obtain more candidates (e.g., 15 or more). Theoretically it may take approximately 8 million iterations to obtain 15 corners from two 3-sigma events. In this example, the two events are correlated in a manner that improves yield. This can be determined from the fact that 5 corners were identified for 1 million out-of-spec iterations, versus the theoretical result of obtaining 1 corner for every 548779 iterations. In other words, this condition is over twice as likely to occur as two 3-sigma uncorrelated events. Output data corresponding to this example is listed below:

```
corner ss rss 4.45352867555012,731628
candidate_corners=5/1000000 [Out of Spec]
.lib ss
  .param cd1_sigma=-0.360743012940107
  .param w_sigma=0.109256828476139
  .param cd2_sigma=1.68792664766133
  .param cd3_sigma=-1.52609812090183
  .param l_sigma=-2.28537902321788
  .param cd4_sigma=2.41185840831727
  .param cd5_sigma=0.832108710345431
  .param cd6_sigma=1.66773801243492
.endl ss
```

Figure 7:
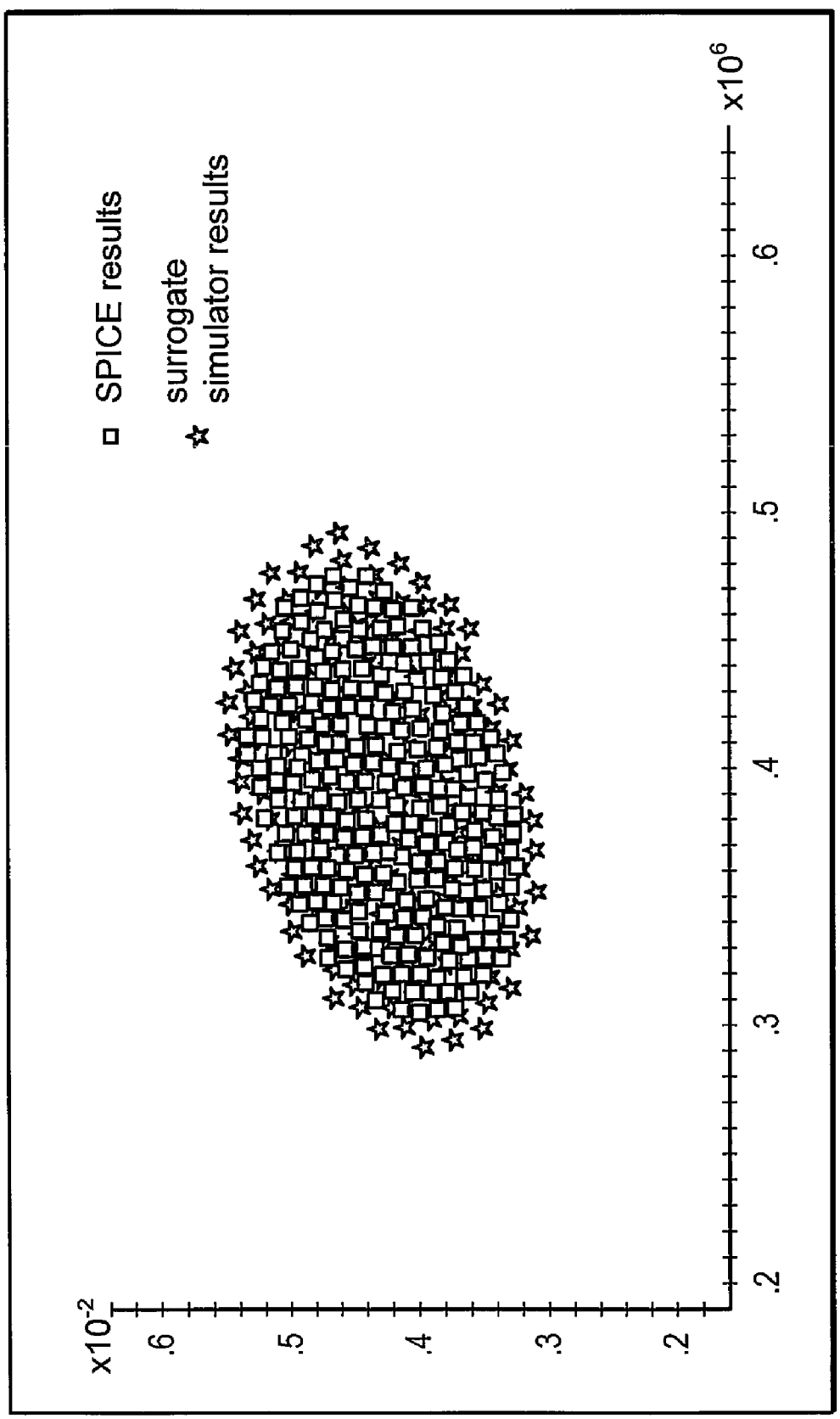
FIG. 7 illustrates an overlay of external simulator results and corresponding surrogate simulation results, according to one embodiment.

A plot of the both the original SPICE results and the surrogate simulation results would show the surrogate simulations results having the same shape and position as the original SPICE results, but with a slight increase in variance due to the deliberate induction of a greater number of candidate corners (i.e., due to the increased number of simulations that may be run using the much faster surrogate simulator). This is illustrated by the exemplary plot in FIG. 7, although the plot includes fewer data points than would be included for the example discussed above.

As previously described, the surrogate simulator may be used to simulate the effects of a process shift, by changing the "mean" input to the percent sigma script. It was Motorola who first noted and published that for any manufacturing process the mean may shift by as much as 1.5 sigma (see, for example, http://www.i-q-i.com/cm/pdfs/article-1_5-sigma-shift.pdf). Due to this phenomenon, the methods described herein may include allowing the input seeds to be shifted in surrogate simulations. In some embodiments, this may allow the designer to assess realistic yield numbers and to simulate "what if" scenarios (e.g., to see if a systematic process shift is likely to improve the semiconductor device yield and/or performance as a whole). This may be more easily achieved in surrogate simulation than using full Monte Carlo simulations because it may be too costly (e.g., in terms of time, memory, or other system costs) to run the large numbers of simulations with various process shifts required using standard Monte Carlo simulation techniques.

Process skew may be simulated using the surrogate simulator by shifting the input seed, while maintaining adherence to the process capability. For example, using a 3-sigma target, rather than simulating from a lower specification limit (LSL) of $-3\sigma$ to an upper specification limit (USL) of $+3\sigma$, the simulation may use a USL of $+4.5\sigma$ and an LSL of $-1.5\sigma$. This simulation still corresponds to the original cp of 1, since $(4.5\sigma+1.5\sigma)/6\sigma=1$. The method described herein may allow the designer to observe shifts in the means, standard deviations, and other measurements of key critical dimensions that result from a process shift of the seeds. In some embodiments, the distribution shape, center, and range may also be manipulated during surrogate simulation to better emulate the effects of process and process shift seen in manufacturing.

An exemplary method for generating the surrogate model, as in 540 of FIG. 5, and for improving the model, is illustrated in FIG. 8 and described in more detail below. As shown in FIG. 8, the method may begin by obtaining external simulator results, as in 610. As described above, these results may be the output of multiple SPICE simulations, each of which involves varying individual critical device parameters and determining corresponding changes in circuit metrics, according to a model of the variability of each circuit metric. For example, delay may be modeled as a function of length and width, as shown in 610, and length may be modeled in terms of its nominal value and standard deviation.

In the exemplary method illustrated in FIG. 8, two sets of data may be extracted from the external simulator results, as shown in 620 and 630. The "true data" shown in 620 may include the actual simulation output data, in some embodiments. In other embodiments, "true" data may be obtained from measurements of actual semiconductor devices, rather than from a simulation. For example, circuit metric data and corresponding critical device parameters may be measured in special circuits during probing of one or more semiconductor wafers. The "model data" shown in 630 may include some or all of the output data from the external simulator, and may also include exaggerated ranges and/or a focus on particular data ranges of interest. For example, a designer may wish to include a wider range of input values or a finer granularity of input values within a range for device parameters that are likely to be critical to yield and/or performance of a given circuit or collection of circuits on the device.

As shown in 625, statistical data may be obtained directly from the simulator output data. For example, the mean, standard deviation, and other statistical measures may be calculated from the actual simulations performed.

The method illustrated in FIG. 8 may in some embodiments include combining the true data 620 and model data 630 to produce a set of input data 640 for generation of candidate corners, as in 635. In other embodiments, only true data 620 or model data 630 may be provided as input data 640.

An initial Response Surface Model (RSM) may be formulated, as shown at 645 and as previously described. In some embodiments, the RSM may be initially formulated using simple polynomial expansion because there may be little gained by including cross product terms higher than 4th order. For example, in one embodiment, a polynomial expansion with cross product terms and some key non-linear terms $(A*1/\sqrt{x}+B*\ln(x)$, etc.) may be chosen for the model dependent upon the underlying physics, as in the equation below:

$$\text{delay} = \text{delay\_nominal} + \text{l\_StdDev} * \text{l\_sigma} + \text{w\_stdDev} * \text{w\_sigma} +$$
$$\text{lw\_stdDev} * \text{l\_sigma} * \text{w\_sigma} + \text{l\_sq\_stdDev} * \text{l\_sigma}^2 +$$
$$\text{w\_sq\_stdDev} * \text{w\_sigma}^2 + \text{CD3\_StdDev} * \text{CD3\_sigma} \ldots$$

The method may next include fitting the model to the system, as in 643 (i.e., determining the coefficients for the model that correspond to the characteristics of the system). As previously noted, in some embodiments, a commercially available statistical analysis package (e.g., SAS®) may be used to fit this model to the system, while in other embodiments, custom or semi-custom software may be used to generate the surrogate simulation model. The statistical analysis package may in some embodiments generate a goodness fit table, as shown in 657, which may include a summary of the goodness of fit in terms of Pr>|t|. A portion of an exemplary goodness table is included below:

embodiments, the RSM equations may be expressed in assembly, C++, Fortran, Perl, or JAVA™ code, or in programming code of another suitable standard or custom programming language.

If the desired fit tolerance is not satisfied, as shown by the negative exit from 655, the method may next include adding and removing terms until the model fits to the desired level of accuracy. As shown in 650, terms may be discarded based upon their fit. For the example illustrated in Table 1, the CD4_sigma*CD2_sigma and CD4_sigma*CD6_sigma terms may be discarded, since these terms have a Pr>|t| value much greater than 0, indicating a high degree of error.

The method may next include adding additional non-linear terms (e.g., ln(x), 1/sqrt(x), etc.) to the polynomial terms that fit, as in 650, and reformulating the RSM according to the discarded and added terms, as in 647. The method may include iterating on the operations illustrated as 643 through 647 until the desired fit is achieved. This is indicated in FIG. 8 by the feedback loop from 643 through 647. In some embodiments, if there is any known insight into the relationship of various terms, that relationship may be expressed in the initial formulation of the RSM or after the first or subsequent iterations of fitting and removing/adding terms.

Figure 9:
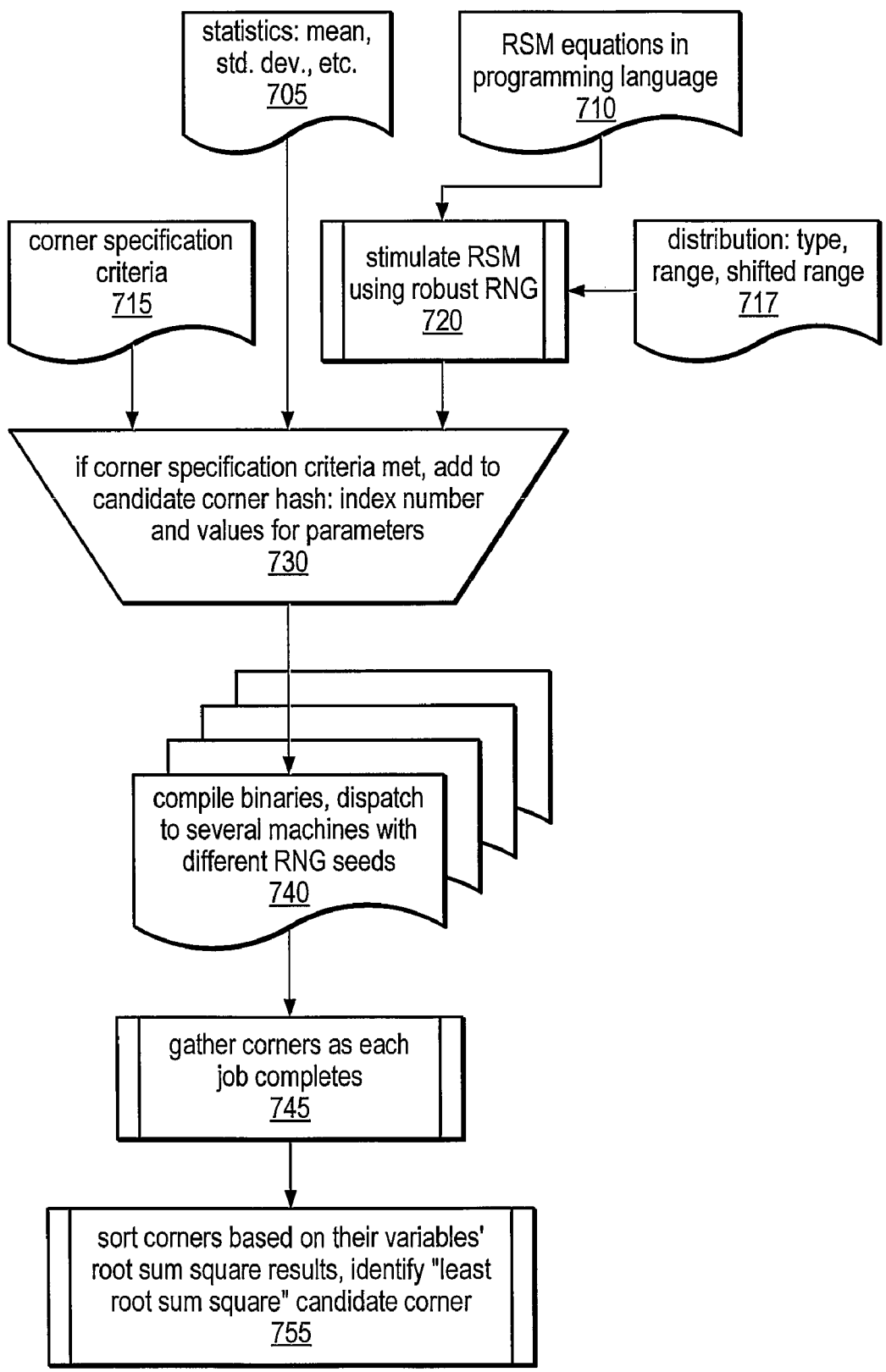
FIG. 9 illustrates an exemplary method for generating candidate corners using a surrogate simulator.

An exemplary method for generating candidate corners using a surrogate simulator is illustrated in FIG. 9 and described in more detail below. As shown at 705 and 710, inputs to the method may include statistics (such as those obtained from measurements or simulation in 625 of FIG. 8), and RSM equations (such as those generated by the method of FIG. 8). Corner specification criteria may also be input to the surrogate simulator, as shown at 715. For example, the corner criteria may specify that a given delay metric should have a value less than $-2\sigma$ and a given power metric should have a value greater than $+2\sigma$.

In the method illustrated in FIG. 9, the RSM equations may be stimulated using a robust range of inputs, as in 720, to determine candidate corners that meet the specified corner criteria. In some embodiments, the distribution of the inputs (e.g., the distribution shape/type, the range, or a shift in the range) may be specified in another set of inputs, shown as 717. In some embodiments, using the surrogate simulator defined by the RSM equations may allow a large number of

TABLE 1

| Parameter | Estimate | Standard Error | t value | Pr > \|t\| |
|---|---|---|---|---|
| Intercept | −.0003680790 | 6.216506E−10 | −592100 | <.0001 |
| CD4_sigma | 0.0000203992 | 2.716302E−10 | 75099.2 | <.0001 |
| CD4_sigma * CD4_sigma | −.0000001090 | 2.014129E−10 | −541.04 | <.0001 |
| CD4_sigma * w_sigma | −.0000001213 | 2.790484E−10 | −434.73 | <.0001 |
| CD4_sigma * CD3_sigma | 0.0000000891 | 2.720632E−10 | 327.43 | <.0001 |
| CD4_sigma * CD2_sigma | −.0000000000 | 2.735388E−10 | −0.08 | 0.9388 |
| CD4_sigma * CD1_sigma | −.0000000448 | 2.787607E−10 | −160.53 | <.0001 |
| CD4_sigma * CD6_sigma | 0.0000000002 | 2.739931E−10 | 0.82 | 0.4142 |
| ... | | | | |

In this example, only the simplest terms (e.g., slope/intercept or $2^{nd}$ order polynomial terms) may be used to in the RSM equations initially. If the desired fit tolerance is satisfied, as shown by the positive exit of 655, the equations of the RSM may be passed to an internal function call or passed to an external numerical simulator, in some embodiments. For even greater throughput, the equations may in some embodiments be written out using a programming language suitable for including in a simulation. For example, in various iterations to be simulated (e.g., millions of samples) at a reasonable cost (e.g., in terms of execution time, memory, system or component costs, etc.). One measure of the robustness of the range may be that each seed in the sequence is unique (i.e., different from all the other seeds) so that each sample adds value to the simulation.

In the example illustrated by FIG. 9, if the corner specification criteria are met for a given iteration, the device parameters corresponding to that iteration are added to a candidate corner hash table, as in 730. The candidate corner hash table may be used to store an index number (e.g., the sample number) and values for the device parameters corresponding to the iteration. In other embodiments, candidate corner information (such as an index and device parameter values) may be stored in a different type of data structure, or may be output directly from the corner generation method at this point.

Once the initial candidate corners are identified, the simulation application may be compiled and executed at each of the candidate corners, as in 740. In some embodiments, compiled binaries of the simulation application may be dispatched to several machines of a distributed computing environment, or to several processors of a multi-processor machine, for parallel execution. For example, each compiled binary may be dispatched with a different subset of the input seeds specified in the input range (e.g., as in 717).

As each of the dispatched simulations completes, the output data for each of the candidate corners may be gathered, as in 745. The corners may be then be sorted, as previously discussed, according to the root sum square (RSS) results of their variables, as in 755. The "best" candidate corner(s) may then be identified as those having the least RSS values. For example, the best corner may be one corresponding to the combination of out-of-specification device parameters that are most likely to occur, and that have an associated sigma value of 3.281. This combination may be used to delineate a region of the process window having a yield point of 517 PPM out-of-specification.

In some embodiments, after identifying the least RSS candidate, the method may also include comparing the PPM yield point vs. the theoretical yield point. For example, in some embodiments, the method may include a check to make sure that the Gaussian assumption initial made holds true for this process and for the device being simulated. (Note that the Central Limit Theorem suggests that it should). In such embodiments, the method may include reporting to the designer that the correlation between metrics helps or hinders yield.

A typical application of the methods disclosed herein may be illustrated using the example below. In this example, one or more process corners and their corresponding yields may be determined using the methods described herein. As previously noted, a process corner may be derived as the set of process points beyond which one or more metrics lie outside of their specification limits (i.e., the values of the one or more metrics lie within the tails of the distributions of the metrics). Yield, on the other hand, may be derived when the values of all of the metrics of interest lie within their specification limits (i.e., the interior of the distributions, between the tails).

In this example, a generic statement for a defining a process corner in which two specification limits are achieved (or exceeded) simultaneously may be of the following form:

metric1>=USL && metric2<=LSL

In this case, the corner is defined when the value of metric1 is greater than or equal to its upper specification limit (USL) and metric2 is less than or equal to its lower specification limit (LSL). Note that the use of the AND operator (&&) in the above statement indicates that both of the specified criteria must be met in order to define the corner. If the OR operator (||) were used as opposed to the AND operator (&&), this would indicate that either or both metric's specification limits being achieved or exceeded would be adequate to define the corner.

In this example, a process corner in which Idsat values are at their high end and threshold voltage is at its low end may be a good corner to represent a fast device. To derive a corner for this high Idsat, low threshold voltage point, the following statement (which has the same form as the generic statement above) may represent the corner criteria:

Idsat>=USL_id && Vt<=LSL_vt

Another statement of corner criteria representing "fast devices" (e.g., in terms of transistor speed) may include an additional term dependent on gate capacitance, as follows:

Idsat>=USL_id && Vt<=LSL_vt && Cgate>=USL_cg

Yet another statement of corner criteria representing "fast devices" (e.g., in terms of a data path) may be:

Idsat>=USL_id && Vt<=LSL_vt && Cgate<=LSL_cg

Note that a thinner oxide may be associated with higher gate capacitance, since it may allow the transistor channel form more quickly and therefore produce a faster transistor. However, a high gate capacitance in one data path stage may load a previous data path stage more than a lower gate capacitance would, thereby slowing it down. Therefore, the process corners that produce relatively fast individual transistors may also produce relatively slow data paths. An analysis of the simultaneous yield for these conditions may then be used to determine if the device may be manufactured with both reasonable performance and reasonable yield. Alternatively, the corner criteria may be defined in terms of specification limits on delay measurements themselves (e.g., for a representative circuit.) This way, candidate corners may be derived that inherently exhibit appropriate Vt, Cgate, and Idsat relationships.

A generic statement defining yield in terms of two metrics may be as follows:

metric1>=LSL && metric1<=USL && metric2>=LSL && metric2<=USL

As defined by this statement, the device will yield at each process point at which both metric1 and metric2 are between their upper and lower specification limits.

In this example, a normal distribution with a mean of zero and a stdDev of 1 is assumed, with a lower specification limit (LSL) of −1 sigma and an upper specification limit (USL) of +1 sigma. For each yield condition, assuming a +1 sigma to −1 sigma range, the percentage yield may be expected to be 68.269. For the simultaneous yield of the two conditions, the percentage yield of each would be multiplied together:

$$0.68269 * 0.68269 = 0.466066$$

Therefore, if the results of surrogate simulation indicate significantly more than 466066 candidate solution points per million simulations, the correlation between metric1 and metric2 may improve the yield. If, however, the solution is found to have significantly fewer than 466066 candidate solution points per million simulations, the correlation between metric1 and metric2 may hinder the yield.

In this example, assume the corner condition of interest is of the form:

metric1>=USL && metric2<=LSL

If the 1 sigma UTPN for each metric is 0.158655, the yield for the two simultaneous conditions (+1 sigma for metric1 and −1 sigma for metric2) may be found by multiplying the values together:

$$0.158655 * 0.158655 = 2.5171409 E^{-2}$$

This equates to a sigma value of ~1.9574 sigma (calculating backward to determine the UTPN) or 25171 out-of-spec parts per million (PPM). The RSS (Variance Sum Law I or II) calculation may be compared to this sigma value, and the number of candidate corners may be compared to the 25171 PPM theoretical value to determine the effect of the correlation of the two conditions. If the out-of-spec PPM produced via surrogate simulation is less than this theoretical value, the correlation between the metrics may help the yield; if it is greater than this theoretical value, the correlation between the metrics may hinder the yield.

Similarly, if the RSS calculation produced via surrogate simulation is greater then the theoretical sigma value, it may be concluded that the combination defined by the corner criteria is not very likely to occur and that it may be ignored, or at least de-prioritized, by the designers. In this case, the correlation between the metrics may inadvertently improve the yield of the device. If the RSS calculation produced via surrogate simulation is less than the theoretical calculation, it may be concluded that the likelihood of hitting the defined process corner is high and that the designers should prioritize their design considerations accordingly. In this case, the correlation between the metrics may inadvertently hinder the yield (e.g., if it is not identified and mitigated).

Note that when deriving simultaneous yield, an unlimited number of conditional statements (in terms of metrics and their specification limits) may be considered. The more conditional statements that are included in the derivation, the better the ability to predict yield for the entire semiconductor product may be. When deriving simultaneous corners, one limitation on the methodology may be the number of compute cycles that may be reasonable to consume. In one example, if there are six conditional statements describing a corner, and the specification limits are all set to 1 sigma, 10 to 20 candidate corners may be derived using 1 million simulations [UTPN(spec_limit_sigma)$^n$].

Figure 10:
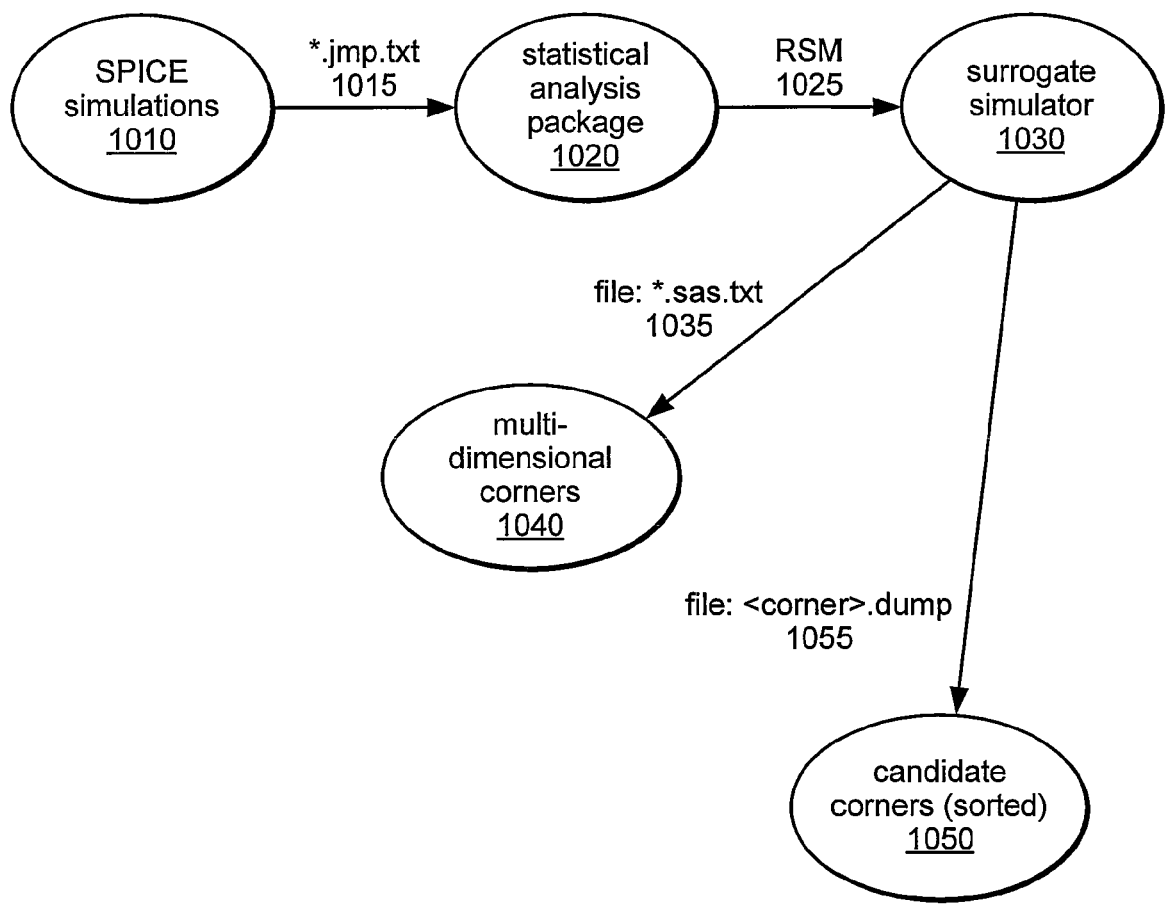
FIG. 10 illustrates an exemplary data flow diagram for the methods described herein.
Figure 11:
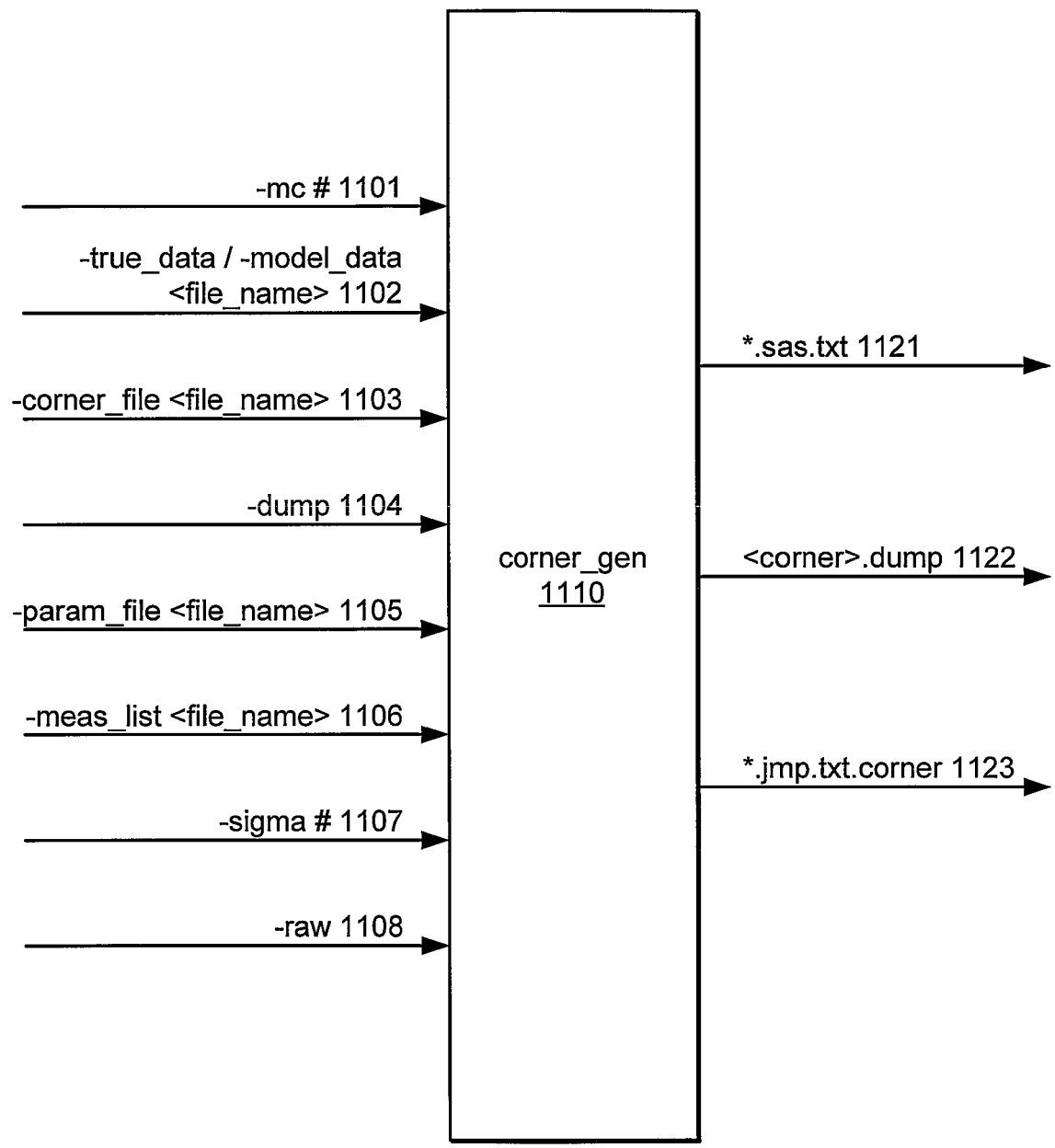
FIG. 11 illustrates inputs and outputs of the overall corner generation methodology, according to one embodiment.

The methods described herein for generating and sorting candidate process corners for simulation using a surrogate simulator may in some embodiments be implemented as a collection of software methods. For example, they may be implemented in a software package that includes a percent sigma script, a response surface model generation module, a surrogate simulation application module, and a corner generation module, and that interfaces (or calls) an external circuit simulator application and a statistical analysis package. One such implementation is illustrated in FIGS. 10 and 11. FIG. 10 illustrates an exemplary data flow diagram for the methods described herein.

In this example, individual parametric statistics from initial circuit simulations 1010 (e.g., SPICE simulations) are output from the external simulator to a file (i.e., a *.jmp.txt file 1015) and fed into a statistical analysis package 1020. The *.jmp.txt file 1015 includes derived statistical measurements (e.g., the seeds of the initial circuit simulations and the measured results). In some embodiments, these statistical values may be combined with other simulation data and/or measured data, such as true data 620 or model data 630, in *.jmp.txt file 1015.

The statistical analysis package 1020 may generate the RSM equations 1025 from the data in *.jmp.txt file 1015, as described herein. These RSM equations may then be fed into surrogate simulator 1030, along with other inputs (described in more detail below). The set of output data of the surrogate simulator may be written to a *.sas.txt file 1035, in this example. The *.sas.txt file 1035 may include raw data defining all the multi-dimensional corners simulated in the surrogate simulator, in some embodiments. Another set of data output from the surrogate simulator may be written to one or more <corner>.dump files 1055. The <corner>.dump files 1055 may in some embodiments include only the candidate corners that meet the corner specification criteria or may include data for all simulated corners sorted in the order of their likelihood of occurrence, in other embodiments.

All of the modules illustrated in FIG. 10 may be considered components of a corner generation package, such as corner_gen 1110, illustrated in FIG. 11. FIG. 11 illustrates, in more detail, various inputs and outputs of the overall corner generation methodology described herein, according to one embodiment. In this example, the inputs to the methodology are shown on the left hand side of FIG. 11 as inputs to corner_gen 1110, and the outputs are shown on the right hand side of FIG. 11 as outputs from corner_gen 1110. Note that the inputs to corner_gen 1110 may be fed into one or more software modules using any of various input means, including, but not limited to command line options, configuration files, execution scripts, batch commands or scripts, menu selections of a graphical used interface, text boxes of a graphical user interface, etc. Similarly, although the outputs of the corner_generation process are illustrated as being written to three files (or file types) the outputs may be presented using other means, including, but not limited to database records, printed (hardcopy) output, graphical or textual output of a graphical user interface, etc.

In the example illustrated in FIG. 11, the inputs may be considered command line options for a corner_gen software application. Therefore, an exemplary command for invoking the corner generation application may have the form:

prompt>corner_gen-corner_file<mycorners>-true_data<mydata>.jmp.txt

In this example, the corner_gen application will be executed using a corner file input (called, "mycorners") and a true data file input (called, "mydata.jmp.txt"). Other command line options illustrated in FIG. 11 as inputs are described below:

- -mc #1101, the number of surrogate iterations. In some embodiments, the default value may be set to 10 time the input count data set count.
- -true_data <file-name> 1102, a true data file, as described above. In some embodiments, the first row is a list of seeds and measured results (i.e., data to be included in *.jmp.txt). For example, this file may contain output from a SPICE simulation with Gaussian seeds: mean=0, standard deviation=1.
- -model_data <file-name> 1102, a model data file, as described above. In some embodiments, the first row is a list of seeds and measured results (i.e., data to be included in *.jmp.txt). For example, this file may contain output from a SPICE simulation with uniform seeds: min=−4.5, max=4.5.
- -corner-file <file-name> 1103, list of corners (by name) and corner criteria. For example, for a corner "slow delay", this may be defined in terms of picoseconds (slow delay<1.2p) or sigma (slow delay<−2σ). An example corner with multi-dimensional conditions: strong delay<−2σ && idrive>2σ && vt>2σ. Each corner may be specified using the following format:
  <corner_name> <measure> <inequality> <specs> && <multi-criterion> . . .
- -dump, dumps all candidate corners to the <corner>.dump files. In some embodiments, they may be written out in a spice_stat -mc_file (.data) format and used as input for subsequent SPICE simulations.
- -param_file <file>, includes a list of parameters having the following format (for 3-sigma spec limits, in this example):
  param_name LOWER UPPER DIST DOMAIN
  e.g., myparam −3.0 3.0 gauss CM
  to shift process, change values of LOWER, UPPER:
  myparam −1.5 4.5 gauss CM
- -meas_list <file>, includes a list of .measure names
- -sigma [#], sigma target used to derive sigma specified criteria (-corner_file). In some embodiments, this sigma applies to all measurements.

-raw, dumps the surrogate raw simulation output into a *.sas-.txt file

In some embodiments, different (or additional) command line options may specify other corner generation criteria and/or execution parameters. For example, one command line option may be used to specify that the corner_gen application should be run on the desktop, rather than in a distributed environment. Another command line option may be used to specify a t value above which terms should be excluded (e.g., - t_value 0.05). In some embodiments, a command line option may specify the order of the polynomial expansion (e.g., -rsm_order 3), although in many embodiments, selecting anything higher than $2^{nd}$ order may greatly increase execution time while adding little value to the simulation results. In yet other embodiments, a command line option (e.g., -raw_corners) may specify that raw candidate corner data be written to a *.cor.txt file, to be used to check model accuracy, as opposed to the <corner>.dump files, which are used in SPICE. Various embodiments may also specify a location or path for storing any temporary files used by the corner_gen application (e.g., -tempfiles<pathname>).

A second exemplary commands for invoking the corner_gen application ise described in detail below:
corner_gen -true_data mydatafile -mc 100000 -raw -corner file my_corner This command may be used to determine parametric and total yield for the conditions specified in the file "my_corner" and to derive process corners at which the device will be out of spec for the specified conditions. In this example, the corner_gen application will first determine the parametric yield for each individual condition specified in my_corner, using the data in the file "mydatafile". In this example, it is assumed that the data in mydatafile is the output of a SPICE simulation for 20,000 samples, while a single device parameter is swept across a specified range.

In this example, the file "my_corner" includes the following conditions:
    condition 1: parameter1_spec parameter1>lower_limit1 && parameter1<upper_limit1
    condition 2: parameter1_spec parameter2>lower_limit2 && parameter2<upper_limit2

The corner_gen application will calculate the parametric yield for each condition using the data from the 20,000 samples in mydatafile, and will generate candidate corners for each condition individually, by generating a surrogate simulation and running 100,000 samples.

In this example, the file "my_corner" also includes the following multi-variable criterion:
    condition: parameter1>lower_limit1 &&
    parameter1>upper_limit1 &&
    parameter2>lower_limit2 &&
    parameter2<upper_limit2

The corner_gen application will calculate the total yield for the multi-variable condition using the data from the 20,000 samples in mydatafile and will generate candidate corners for the multi-variable condition by generating a surrogate simulation and running 100,000 samples.

In this example, the file "my_corner" also includes the following multi-variable criterion for four other process corners (e.g., SF, FS, FF, and SS corners):
    condition: parameter2_sf<limit3 && parameter1>limit4
    condition: parameter2_fs>limit5 && parameter1<limit6
    condition: parameter2_ff>limit5 && parameter1>limit4
    condition: parameter2_ss<limit3 && parameter1<limit6

The corner_gen application will calculate the probability of hitting each of the multi-variable conditions using the data from the 20,000 samples in mydatafile and will generate candidate corners for each of the multi-variable conditions by generating a surrogate simulation and running 100,000 samples.

Note that in other embodiments, the methods described herein may include more or fewer operations than in the illustrated examples and/or may be partitioned into more, fewer, or different software modules than those described. In still other embodiments, the methods, or portions thereof, may be implemented in software with support from dedicated hardware. For example, the system may include dedicated hardware for accelerating execution of the methods, or that may be used to gather parametric data and/or circuit metric measurements, in different embodiments.

Figure 12:
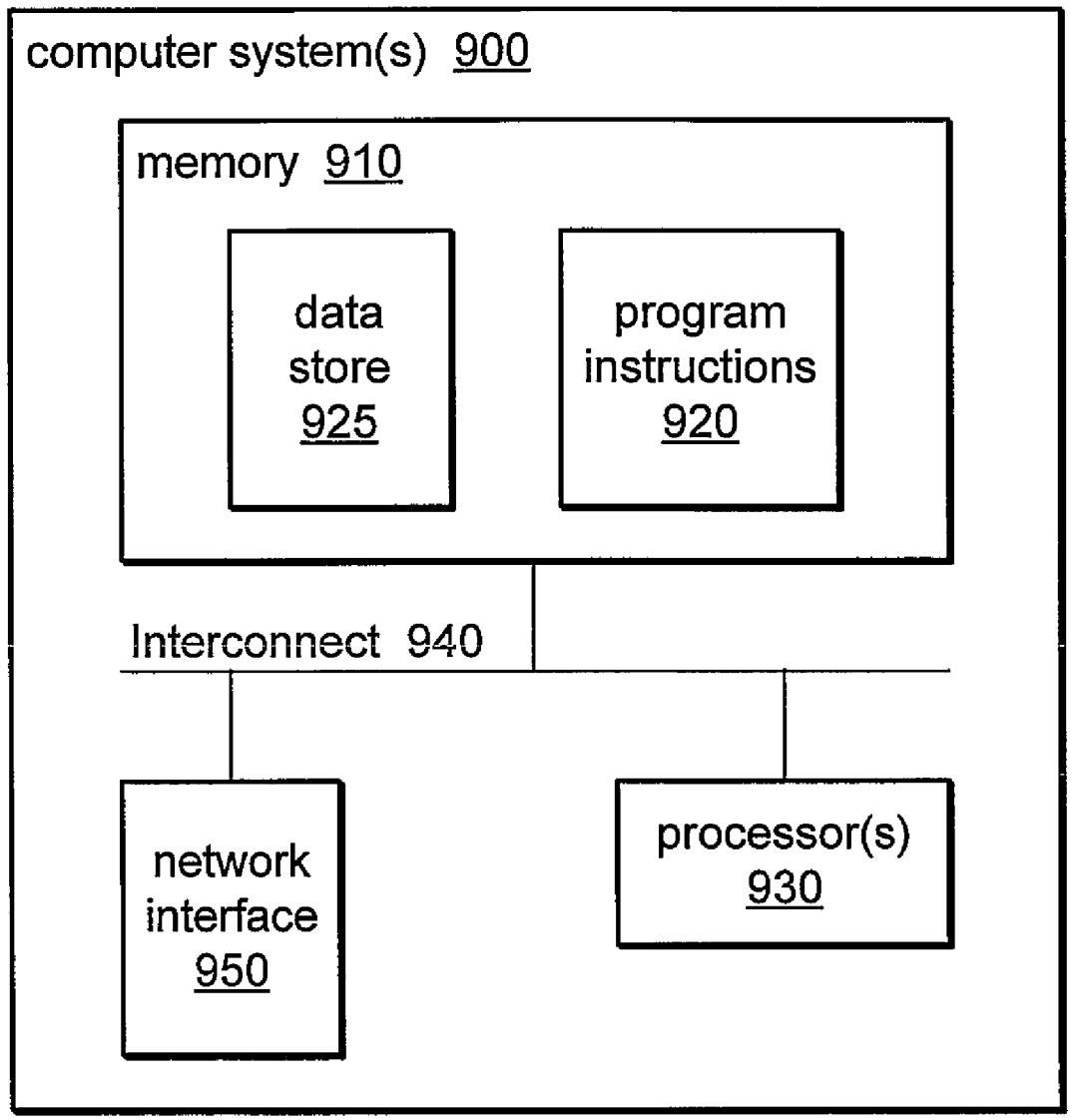
FIG. 12 illustrates an exemplary computing system suitable for implementing the methodologies described herein, according to various embodiments.

As noted above, in some embodiments, program instructions may be configured to implement the methods described herein for generating process corners using a surrogate simulator. FIG. 12 illustrates a computing system capable of implementing such methodologies, according to various embodiments. Computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 900 may include at least one processor 930. Processor 930 may couple across interconnect 940 to memory 910. Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions 920 configured to implement all or a portion of the methods described herein. The methods may be implemented in any of various programming languages or methods, according to various embodiments. Memory 910 may also include data store 925. Data store 925 may be used to store final outputs or intermediate data generated by the methods described herein, including, but not limited to, simulation data, measured device parameters and circuit metrics values, a candidate corner hash table or list, or any of the files described herein (e.g., <corner>.dump files, *.sas.txt files, or *.jmp.txt files) in various embodiments.

As previously noted, the methods described herein may be dispatched for parallel execution on several processors 930 of a multi-processor computing system 900, or on two or more computing systems 900 in a distributed computing environment, according to various embodiments. For example, two or more computing systems 900 may communicate using network interface 950. In some embodiments, each of a plurality of processors 930 or a plurality of computing systems 900 may be identical to those illustrated in FIG. 11, while in other embodiments some or all of a plurality of processors 930 and/or computing systems 900 may have more, fewer or different components than those illustrated in FIG. 11 and described above.

It should be appreciated that although embodiments described herein include techniques executed by software modules, operations discussed herein may consist of directly entered commands by a computer system user, such as a user of computer system 900, in some embodiments. The functionality of step referred to herein may correspond to the functionality of modules or portions of modules, according to various embodiments. In addition to software modules, the above flows or portions of flows may, in some embodiments, be implemented as application instructions or menu items. For example, an operation that identifies one or more candidate corners based on corner specification criteria may be an application instruction provided by a software package that includes the functionality described herein, according to some embodiments.

The operations illustrated in the various flow charts and data flow diagrams and described herein may be modules or portions of modules (e.g., software, firmware, or hardware modules), according to various embodiments. For example, the software modules discussed herein may include script, batch or other executable files, or combinations and/or portions of such files. In some embodiments, the software modules may include a computer program or subroutines thereof encoded on computer accessible media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiments are for illustration only. Operations may be combined or the functionality of the operations may be distributed in additional operations in accordance with the invention, according to various alternate embodiments.

Thus, the flows described herein, the operations thereof and modules therefore may be executed on a computer system configured to execute the operations of the flows and/or may be executed from computer accessible media, according to various embodiments. In some embodiments, the flows may be embodied in a machine-readable and/or computer accessible medium for configuring a computer system to execute the flows. Thus, the software modules may be stored within and/or transmitted to a computer system memory to configure the computer system to perform the functions of the module, according to various embodiments.

The flows described herein may be applied to an entire semiconductor device or to portions thereof, according to various embodiments. For example, the methods may be applied to portions of a semiconductor device as their designs are completed, or to different circuits or functional blocks of the design in a hierarchical fashion, according to different embodiments.

Although the above embodiments have been described in relation to several specific commercially available EDA tools and statistical analysis tools, the techniques described herein may be applicable to and make use of any standard or custom EDA tools and implemented in any suitable programming language, according to various embodiments.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method comprising:
   identifying two or more device parameters of a semiconductor device;
   defining specification limits for one or more performance measures of the semiconductor device;
   determining a distribution of each of the one or more performance measures as the two or more device parameters vary;
   generating a surrogate simulation model dependent on said distribution of each of the one or more performance measures;
   simulating behavior of the semiconductor device using the surrogate simulation model;
   identifying one or more candidate process corners dependent on results of said simulating, wherein a candidate process corner defines a combination of values for two or more of the two or more device parameters for which said results of said simulating indicate that pre-determined criteria based on said specification limits for one or more of the one or more performance measures are met.

2. The method of claim 1, further comprising estimating a manufacturing yield of the semiconductor device by simulating the semiconductor device at one of the one or more candidate process corners.

3. The method of claim 1, further comprising sorting the one or more candidate process corners according to their respective root sum square values to identify a pre-determined number of candidate process corners nearest to a process center.

4. The method of claim 1, further comprising determining that two or more of the two or more device parameters exhibit a positive correlation, a negative correlation, or no correlation with respect to the one or more performance measures.

5. The method of claim 1, further comprising verifying applicability of each of the one or more candidate process corners by repeating said determining a distribution of each of the one or more performance measures using the values of each of the two or more device parameters defined by each of the candidate process corners.

6. The method of claim 1, further comprising simulating a manufacturing process shift using the surrogate model by replacing the determined distribution with a modified distribution representing the manufacturing process shift in a surrogate model simulation instance.

7. The method of claim 1, wherein the surrogate model comprises a Response Surface Model (RSM).

8. The method of claim 1, wherein said simulating behavior of the semiconductor device using the surrogate simulation model comprises simulating the behavior of the semiconductor device using a larger input data set than an input data set used in said determining a distribution of each of the one or more performance measures dependent on each of the two or more device parameters.

9. The method of claim 1, further comprising refining said surrogate model by discarding terms corresponding to device parameter value combinations that are not correlated to the one or more performance measures or are not physically likely to occur.

10. The method of claim 1, wherein said determining a distribution comprises, for each given one of the two or more device parameters, simulating the semiconductor device while varying the given one of the two or more device parameters and not varying any other device parameters.

11. The method of claim 1, wherein said determining a distribution comprises accessing performance measurement data collected from an instance of the semiconductor device during testing.

12. A computer-readable storage medium comprising program instructions computer-executable to implement:
identifying two or more device parameters of a semiconductor device;
defining specification limits for one or more performance measures of the semiconductor device;
determining a distribution of each of the one or more performance measures as the two or more device parameters vary;
generating a surrogate simulation model dependent on said distribution of each of the one or more performance measures;
simulating behavior of the semiconductor device using the surrogate simulation model;
identifying one or more candidate process corners dependent on results of said simulating, wherein a candidate process corner defines a combination of values for two or more of the two or more device parameters based on said specification limits for which said results of said simulating indicate that pre-determined criteria for one or more of the one or more performance measures are met.

13. The storage medium of claim 12, further comprising program instructions computer-executable to implement estimating a manufacturing yield of the semiconductor device by simulating the semiconductor device at one of the one or more candidate process corners.

14. The storage medium of claim 12, further comprising program instructions computer-executable to implement sorting the one or more candidate process corners according to their respective root sum square values to identify a pre-determined number of candidate process corners nearest to a process center.

15. The storage medium of claim 12, further comprising program instructions computer-executable to implement determining that two or more of the two or more device parameters exhibit a positive correlation, a negative correlation, or no correlation with respect to the one or more performance measures.

16. The storage medium of claim 12, further comprising program instructions computer-executable to implement simulating a manufacturing process shift using the surrogate model by replacing the determined distribution with a modified distribution representing the manufacturing process shift in a surrogate model simulation instance.

17. A system, comprising:
a processor; and
a memory, wherein the memory comprises program instructions executable by the processor to:
identify two or more device parameters of a semiconductor device;
define specification limits for one or more performance measures of the semiconductor device;
determine a distribution of each of the one or more performance measures as the two or more device parameters vary;
generate a surrogate simulation model dependent on said distribution of each of the one or more performance measures;
simulate behavior of the semiconductor device using the surrogate simulation model;
identify one or more candidate process corners dependent on results of said simulating, wherein a candidate process corner defines a combination of values for two or more of the two or more device parameters for which said results of said simulating indicate that pre-determined criteria based on said specification limits for one or more of the one or more performance measures are met.

18. The system of claim 17, wherein the memory further comprises program instructions executable by the processor to estimate a manufacturing yield of the semiconductor device by simulating the semiconductor device at one of the one or more candidate process corners.

19. The system of claim 17, wherein the memory further comprises program instructions executable by the processor to sort the one or more candidate process corners according to their respective root sum square values to identify a pre-determined number of candidate process corners nearest to a process center.

20. The system of claim 17, wherein the memory further comprises program instructions executable by the processor to simulate a manufacturing process shift using the surrogate model by replacing the determined distribution with a modified distribution representing the manufacturing process shift in a surrogate model simulation instance.

* * * * *

UNITED STATES PATENT AND TRADEMARK OFFICE
CERTIFICATE OF CORRECTION

| | | |
|---|---|---|
| PATENT NO. | : 7,716,023 B2 | Page 1 of 1 |
| APPLICATION NO. | : 11/674572 | |
| DATED | : May 11, 2010 | |
| INVENTOR(S) | : Aaron J. Barker et al. | |

It is certified that error appears in the above-identified patent and that said Letters Patent is hereby corrected as shown below:

On page 2, in column 1, under "Other Publications", line 4, delete "njo." and insert -- no. --, therefor.

In column 4, line 55, delete "-1.56σ," and insert -- -1.5σ, --, therefor.

In column 21, line 23, delete "ise" and insert -- is --, therefor.

In column 21, line 25, delete "file" and insert -- _file --, therefor.

Signed and Sealed this
Twenty-sixth Day of July, 2011

David J. Kappos
*Director of the United States Patent and Trademark Office*